US010440432B2

(12) United States Patent
Strickland et al.

(10) Patent No.: US 10,440,432 B2
(45) Date of Patent: Oct. 8, 2019

(54) SOCIALLY ANNOTATED PRESENTATION SYSTEMS AND METHODS

(71) Applicant: RealNetworks, Inc., Seattle, WA (US)

(72) Inventors: Daniel Strickland, Virginia Beach, VA (US); Joel Jacobson, Seattle, WA (US); Philip Smith, Seattle, WA (US); Phil Austin, Maple Valley, WA (US); Senthil Vaiyapuri, Federal Way, WA (US); Satish Kilaru, Seattle, WA (US); Ravishankar Dhamodaran, Seattle, WA (US)

( * ) Notice: Subject to any disclaimer, the term of this patent is extended or adjusted under 35 U.S.C. 154(b) by 0 days.

(21) Appl. No.: 15/384,214

(22) Filed: Dec. 19, 2016

(65) Prior Publication Data
US 2017/0099520 A1  Apr. 6, 2017

Related U.S. Application Data

(63) Continuation-in-part of application No. 13/916,505, filed on Jun. 12, 2013, now abandoned.
(Continued)

(51) Int. Cl.
*H04N 21/442* (2011.01)
*G06T 1/00* (2006.01)
(Continued)

(52) U.S. Cl.
CPC ... *H04N 21/44218* (2013.01); *G06F 16/7867* (2019.01); *G06Q 50/01* (2013.01); *G06T 1/0007* (2013.01); *H04N 5/225* (2013.01); *H04N 21/234* (2013.01); *H04N 21/2393* (2013.01); *H04N 21/4316* (2013.01); *H04N 21/4722* (2013.01);
(Continued)

(58) Field of Classification Search
CPC ......... H04N 21/44218; H04N 21/4316; H04N 21/8133; H04N 5/225; G06F 17/3082; G06T 1/0007
See application file for complete search history.

(56) References Cited

U.S. PATENT DOCUMENTS 7,430,506 B2   9/2008  Nam et al.
7,461,055 B2  12/2008  Atcheson et al.
(Continued)

FOREIGN PATENT DOCUMENTS

JP      2004-128541 A      4/2004
KR  10-2007-0097678 A     10/2007

OTHER PUBLICATIONS

Associate, archived Oct. 5, 2015, URL=https://web.archive.org/web/20151005033849/www.dictionary.reference.com/browse/associate, download date Feb. 5, 2018, 16 pages.
(Continued)

*Primary Examiner* — Pankaj Kumar
*Assistant Examiner* — Alexander Boyd
(74) *Attorney, Agent, or Firm* — Seed IP Law Group LLP

(57) ABSTRACT

A video-platform server may obtain and provide context-specific metadata to remote presentation devices via an application programming interface. Context-specific metadata may include tags describing one or more assets (social-media-enhanced annotations or other such enhancements arising from viewer selections, e.g.) that are depicted in or otherwise associated with a given sequential position (a segment in a video playback, e.g.).

19 Claims, 14 Drawing Sheets

Related U.S. Application Data

(60) Provisional application No. 61/658,766, filed on Jun. 12, 2012.

(51) Int. Cl.

| | | |
|---|---|---|
| *H04N 5/225* | (2006.01) | |
| *H04N 21/81* | (2011.01) | |
| *H04N 21/431* | (2011.01) | |
| *G06F 16/78* | (2019.01) | |
| *G06Q 50/00* | (2012.01) | |
| *H04N 21/234* | (2011.01) | |
| *H04N 21/239* | (2011.01) | |
| *H04N 21/4722* | (2011.01) | |
| *H04N 21/8549* | (2011.01) | |
| *H04N 21/4788* | (2011.01) | |
| *G06Q 30/00* | (2012.01) | |

(52) U.S. Cl.
CPC ....... *H04N 21/812* (2013.01); *H04N 21/8133* (2013.01); *H04N 21/8549* (2013.01); *G06Q 30/00* (2013.01); *H04N 21/4788* (2013.01)

(56) References Cited

U.S. PATENT DOCUMENTS

| | | | |
|---|---|---|---|
| 7,617,296 B2 | 11/2009 | Bank | |
| 7,752,642 B2 | 7/2010 | Lemmons | |
| 7,882,034 B2 | 2/2011 | Hug et al. | |
| 7,987,280 B1 | 7/2011 | Putnam et al. | |
| 8,059,882 B2 | 11/2011 | Amidi | |
| 8,156,139 B2 | 4/2012 | Zatloukal et al. | |
| 8,666,375 B2 | 3/2014 | Lee et al. | |
| 8,718,256 B2 | 5/2014 | Jeon | |
| 9,135,278 B2 | 9/2015 | Sutherland et al. | |
| 9,367,572 B2 | 6/2016 | Boic | |
| 9,443,001 B2 | 9/2016 | Rathnavelu et al. | |
| 2002/0057286 A1 | 5/2002 | Markel et al. | |
| 2002/0129364 A1 | 9/2002 | Smith et al. | |
| 2004/0105006 A1 | 6/2004 | Lazo et al. | |
| 2005/0229227 A1* | 10/2005 | Rogers | H04N 21/435 725/115 |
| 2005/0255901 A1 | 11/2005 | Kreutzer | |
| 2006/0129458 A1 | 6/2006 | Maggio | |
| 2008/0002021 A1 | 1/2008 | Guo et al. | |
| 2008/0022308 A1* | 1/2008 | Garcea | H04N 21/482 725/46 |
| 2008/0092164 A1 | 4/2008 | Agarwal et al. | |
| 2008/0120646 A1 | 5/2008 | Stern et al. | |
| 2008/0294694 A1 | 11/2008 | Maghfourian et al. | |
| 2009/0024554 A1 | 1/2009 | Murdock et al. | |
| 2009/0132361 A1 | 5/2009 | Titus et al. | |
| 2009/0138906 A1 | 5/2009 | Eide et al. | |
| 2009/0276805 A1 | 11/2009 | Andrews, II et al. | |
| 2010/0088714 A1 | 4/2010 | Hawkins et al. | |
| 2010/0088726 A1 | 4/2010 | Curtis et al. | |
| 2010/0162303 A1* | 6/2010 | Cassanova | H04N 21/4316 725/37 |
| 2010/0205635 A1 | 8/2010 | Boylan, III et al. | |
| 2010/0241961 A1 | 9/2010 | Peterson et al. | |
| 2010/0293598 A1 | 11/2010 | Collart et al. | |
| 2011/0041150 A1 | 2/2011 | Schein et al. | |
| 2011/0067054 A1 | 3/2011 | Karaoguz et al. | |
| 2011/0179445 A1 | 7/2011 | Brown et al. | |
| 2011/0251896 A1 | 10/2011 | Impollonia et al. | |
| 2011/0307332 A1 | 12/2011 | Kim et al. | |
| 2012/0023131 A1 | 1/2012 | Downey et al. | |
| 2012/0033850 A1 | 2/2012 | Owens et al. | |
| 2012/0311625 A1 | 12/2012 | Nandi | |
| 2013/0311287 A1 | 11/2013 | Jacobson et al. | |
| 2014/0053061 A1 | 2/2014 | Chasen et al. | |
| 2014/0059595 A1 | 2/2014 | Jacobson et al. | |
| 2014/0067828 A1* | 3/2014 | Archibong | H04N 21/4788 707/748 |
| 2014/0096167 A1* | 4/2014 | Lang | H04N 21/4788 725/91 |
| 2014/0137144 A1* | 5/2014 | Jarvenpaa | H04N 21/25891 725/13 |
| 2014/0344070 A1 | 11/2014 | Jacobson et al. | |
| 2015/0015690 A1* | 1/2015 | Roh | H04N 21/4788 348/77 |
| 2015/0094046 A1 | 4/2015 | Jung et al. | |
| 2015/0110471 A1* | 4/2015 | Zheng | H04N 21/4788 386/291 |
| 2016/0316251 A1* | 10/2016 | Choi | H04N 21/42201 |
| 2016/0370975 A1* | 12/2016 | Collins | G06F 3/04842 |
| 2017/0019710 A1* | 1/2017 | Kim | H04N 21/44218 |
| 2017/0208362 A1* | 7/2017 | Flores | H04N 21/44218 |
| 2017/0289619 A1* | 10/2017 | Xu | H04N 21/44218 |
| 2018/0067641 A1* | 3/2018 | Lerner | H04N 21/42203 |

OTHER PUBLICATIONS

Hypervideo, Oct. 9, 2012, URL=https://en.wikipedia.org/w/index.php?title=Hypervideo&oldid=516731041, 6 pages.

Indicate, archived Sep. 26, 2015, URL=https://web.archive.org/web/20150926195236/www.dictionary.reference.com/browse/indicate, download date Feb. 5, 2018, 12 pages.

Kalal et al., "Face-TLD: Tracking-Learning-Detection Applied to Faces," *17th IEEE International Conference on Image Processing*, Hong Kong, China, Sep. 26-29, 2010, pp. 3789-3792.

Use VideoClix to create, manage, distribute, measure and monetize clickable videos today . . . , archived Jul. 28, 2013, URL=https://web.archive.org/web/20130728121225/www.videoclix.tv/pages/platform/index.php, download date Feb. 5, 2018, 2 pages.

* cited by examiner

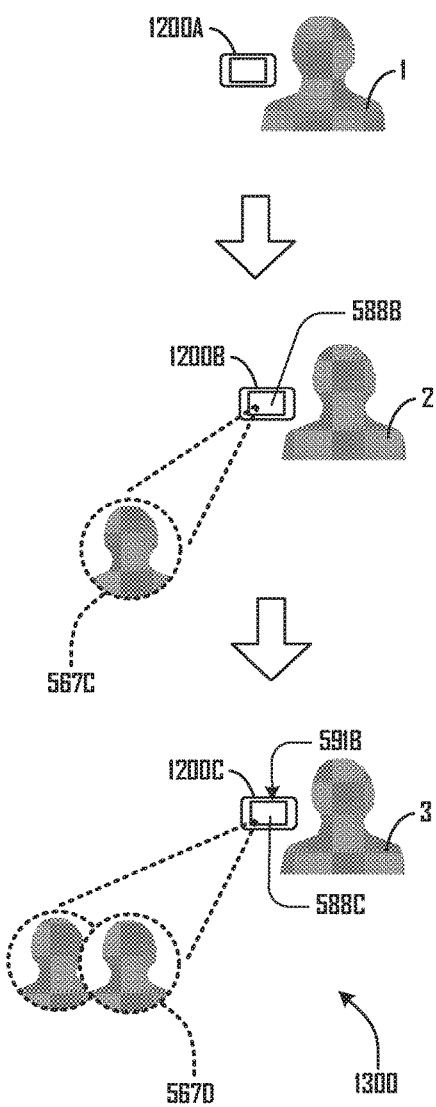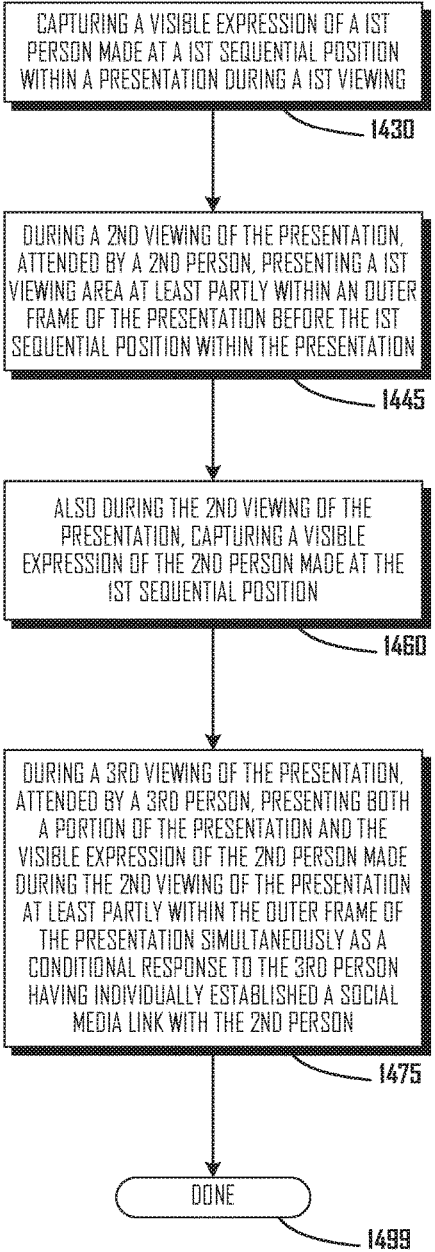

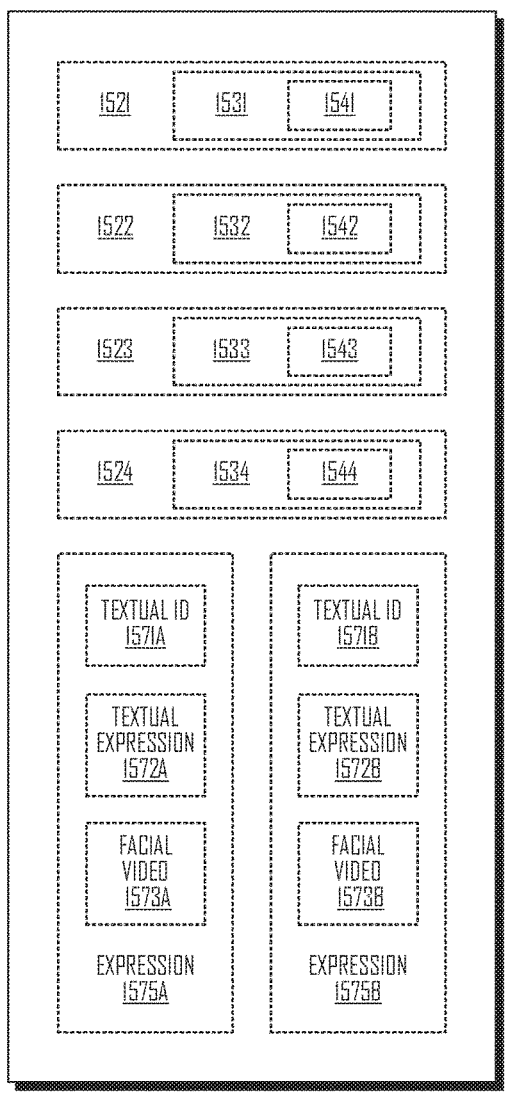

SOCIALLY ANNOTATED PRESENTATION SYSTEMS AND METHODS

CROSS-REFERENCE TO RELATED APPLICATIONS

This application claims the benefit of priority to Provisional Patent Application No. 61/658,766, filed 12 Jun. 2012, titled "CONTEXTUAL ADVERTISING PLATFORM DISPLAY SYSTEMS AND METHODS" and naming inventors Joel Jacobson et al. and to patent application Ser. No. 13/916,505, filed 12 Jun. 2013, titled "CONTEXT-AWARE VIDEO API SYSTEMS AND METHODS" and naming inventors Joel Jacobson et al. The above-cited applications are hereby incorporated by reference, in their entirety, for all purposes.

FIELD

The present disclosure relates to the field of computing, and more particularly, to contextual metadata and other annotations provided via one or more remote client devices.

BACKGROUND

In 1995, RealNetworks of Seattle, Wash. (then known as Progressive Networks) broadcast the first live event over the Internet, a baseball game between the Seattle Mariners and the New York Yankees. In the decades since, streaming media has become increasingly ubiquitous, and various business models have evolved around streaming media and advertising. Indeed, some analysts project that spending on on-line advertising will increase from $41B in 2012 to almost $68B in 2015, in part because many consumers enjoy consuming streaming media via laptops, tablets, set-top boxes, or other computing devices that potentially enable users to interact and engage with media in new ways.

For example, in some cases, consuming streaming media may give rise to numerous questions about the context presented by the streaming media. In response to viewing a given scene, a viewer may wonder "who is that actor?", "what is that song?", "where can I buy that jacket?", or other like questions. A viewer may also benefit from seeing her social media contacts' reactions to and commentary on portions of such media, or may be willing to share her context-specific expressions with her contacts. Existing services may not allow clients to obtain and display such contextual metadata and offer contextually relevant information to viewers as they consume streaming or other video-containing media.

BRIEF DESCRIPTION OF THE DRAWINGS

FIG. 13 illustrates several components of client devices in an exemplary system in accordance with one or more embodiments.

FIG. 14 illustrates a method for implementing social-media-enhanced presentation annotation in accordance with one or more embodiments (performed by a server acting through respective client devices, e.g.).

FIG. 15 illustrates event-sequencing logic in an exemplary system in accordance with one or more embodiments.

FIG. 16 illustrates another method for presentation annotation in accordance with one or more embodiments (performed within a server or via distributed transistor-based circuitry, e.g.).

DESCRIPTION

Figure 1:
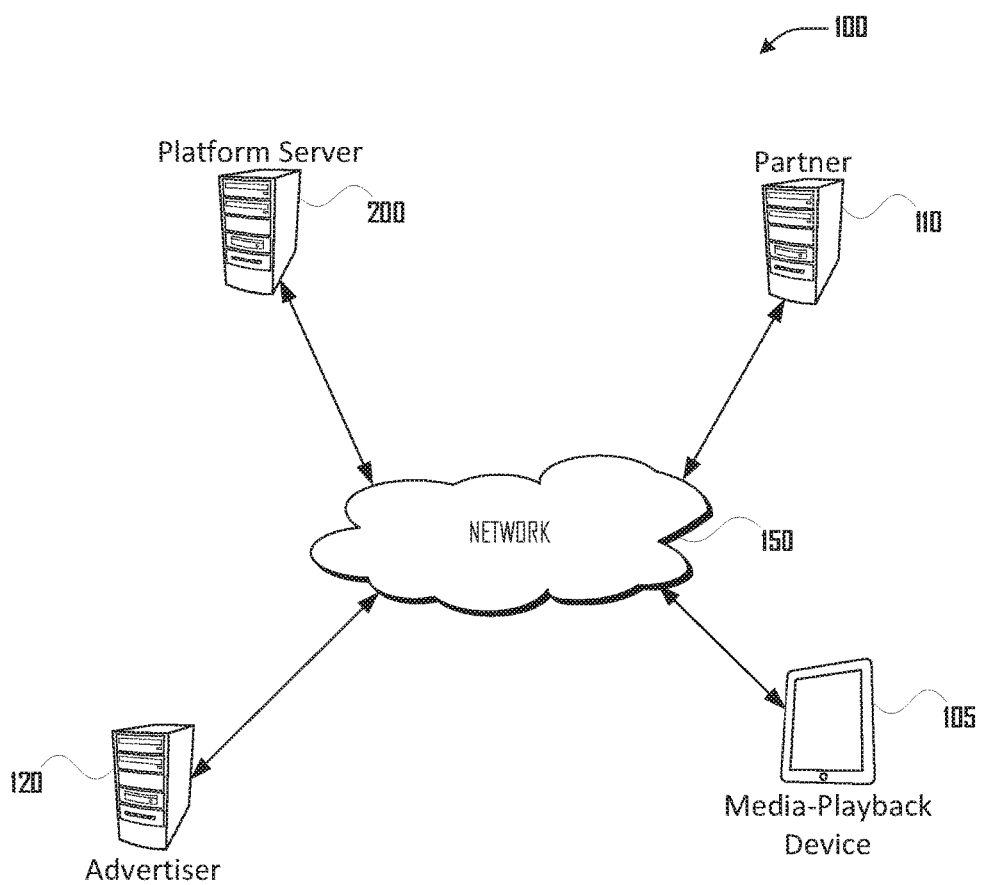
FIG. 1 illustrates a platform system in accordance with one or more embodiments.

The detailed description that follows is represented largely in terms of processes and symbolic representations of operations by conventional computer components, including a processor, memory storage devices for the processor, connected display devices and input devices. Furthermore, some of these processes and operations may utilize conventional computer components in a heterogeneous distributed computing environment, including remote file servers, computer servers and memory storage devices.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

"At least," "automatic," "based," "below," "by," "concerning," "conditional," "during," "enhanced," "first," "in response," "including," "indicated," "local," "obtained," "of," "otherwise," "part," "plural," "received," "remote," "said," "same," "second," "selected," "sequential," "some," "temporal," "thereof," "third," "transmitted," "visible," "wherein," "within," or other such descriptors herein are used in their normal yes-or-no sense, not as terms of degree, unless context dictates otherwise. In light of the present disclosure those skilled in the art will understand from context what is meant by "remote" and by other such positional descriptors used herein. Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 illustrates a platform system in accordance with one or more embodiments. In the illustrated system, video-platform server 200, media-playback device 105, partner device 110, and advertiser device 120 are connected to network 150.

In various embodiments, video-platform server 200 may comprise one or more physical and/or logical devices that collectively provide the functionalities described herein. In some embodiments, video-platform server 200 may comprise one or more replicated and/or distributed physical or logical devices.

In some embodiments, video-platform server 200 may comprise one or more computing services provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

In various embodiments, partner device 110 may represent one or more devices operated by a content producer, owner, distributor, and/or other like entity that may have an interest in promoting viewer engagement with streamed media. In various embodiments, video-platform server 200 may provide facilities by which partner device 110 may add, edit, and/or otherwise manage asset definitions and context data associated with video segments, and by which media-playback device 105 may interact and engage with content such as described herein.

In various embodiments, advertiser device 120 may represent one or more devices operated by an advertiser, sponsor, and/or other like entity that may have an interest in promoting viewer engagement with streamed media. In various embodiments, video-platform server 200 may provide facilities by which partner device 110 may add, edit, and/or otherwise manage advertising campaigns and/or asset-based games.

In various embodiments, network 150 may include the Internet, a local area network ("LAN"), a wide area network ("WAN"), a cellular data network, and/or other data network. In various embodiments, media-playback device 105 may include a desktop PC, mobile phone, laptop, tablet, or other computing device that is capable of connecting to network 150 and rendering media data as described herein.

Figure 2:
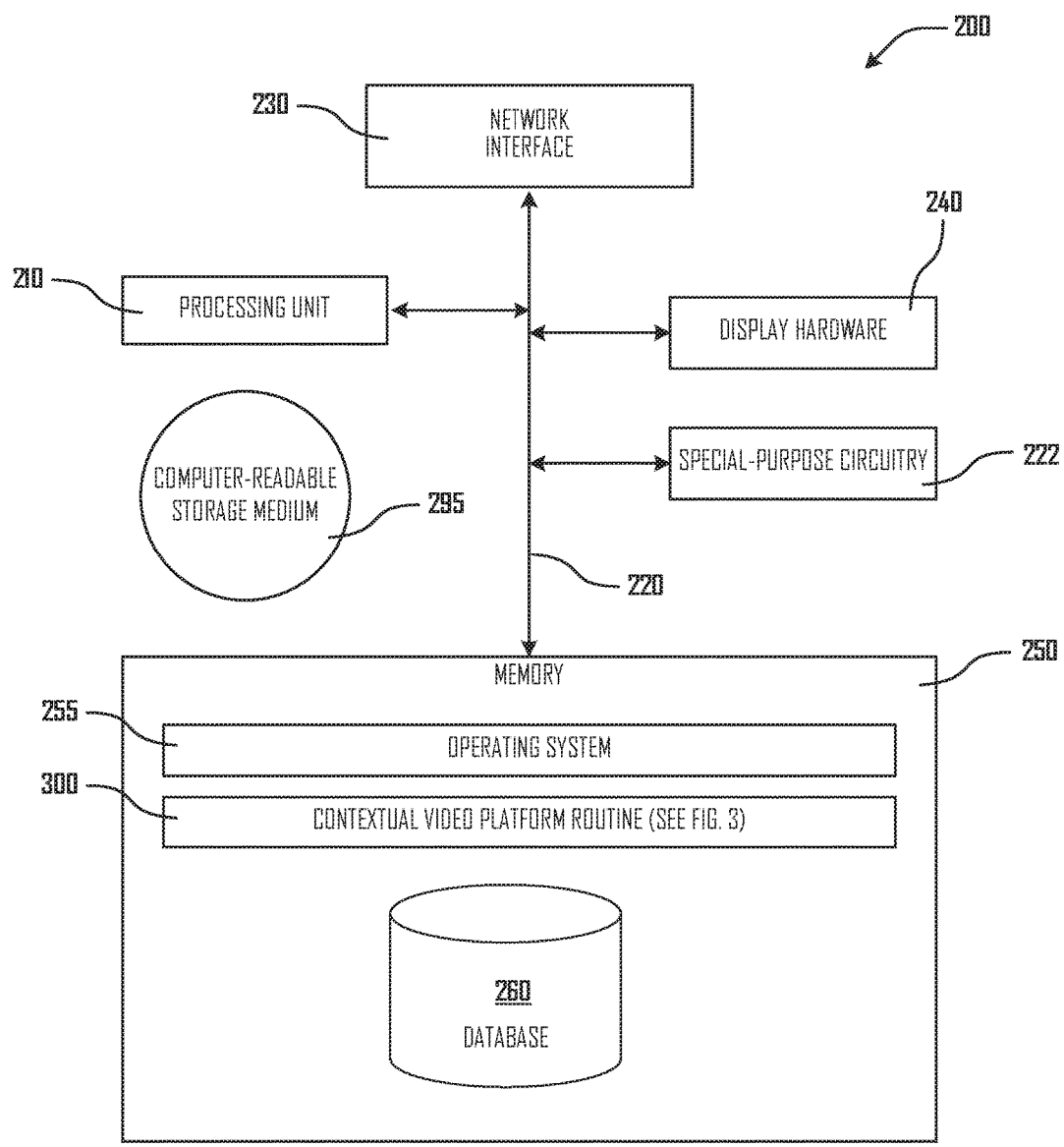
FIG. 2 illustrates several components of an exemplary video-platform server in accordance with one or more embodiments.

FIG. 2 illustrates several components of an exemplary video-platform server in accordance with one or more embodiments. In some embodiments, video-platform server 200 may include many more components than those shown in FIG. 2. However, it is not necessary that all of these generally conventional components be shown in order to disclose an illustrative embodiment.

Video-platform server 200 includes a bus 220 interconnecting components including one or more instances of processing units 210; memory 250; displays 240; or network interfaces 230. Special-purpose circuitry 222 may also be provided (configured to include one or more speech recognition modules, expression ranking modules, or other such functions, e.g.), as further described below (in conjunction with one or more of FIGS. 13-16, e.g.). In various embodiments, also, server 200 may include one or more instances of a mouse, track pad, touch screen, haptic input device, a camera (webcam, e.g.), a pointing and/or selection device, or other such input devices.

Memory 250 generally comprises a random access memory ("RAM"), a read only memory ("ROM"), and a permanent mass storage device, such as a disk drive. The memory 250 stores program code for a routine 400 for providing a platform API (see FIG. 4, discussed below). In addition, the memory 250 also stores an operating system 255.

These and other software components may be loaded into memory 250 of video-platform server 200 using a drive mechanism (not shown) associated with a non-transient computer readable storage medium 295, such as a floppy disc, tape, DVD/CD-ROM drive, memory card, or the like. In some embodiments, software components may alternately be loaded via the network interface 230, rather than via a non-transient computer readable storage medium 295.

Memory 250 also includes database 260, which stores records including records 265A-D.

In some embodiments, video-platform server 200 may communicate with database 260 via network interface 230, a storage area network ("SAN"), a high-speed serial bus, and/or via the other suitable communication technology.

In some embodiments, database 260 may comprise one or more storage services provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Figure 3:
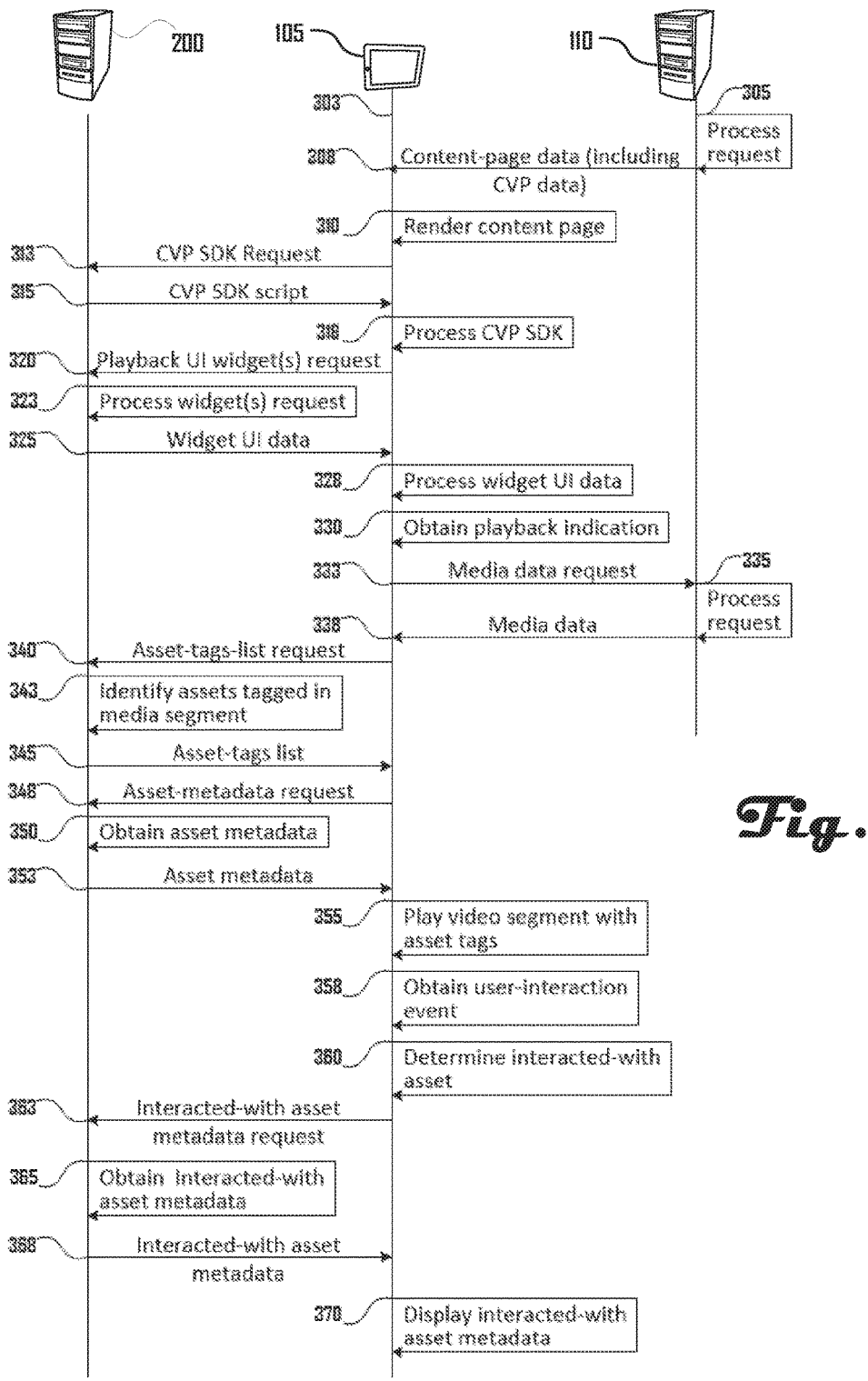
FIG. 3 illustrates an exemplary series of communications between video-platform server, partner device, and media-playback device that illustrate certain aspects of a platform, in accordance with one or more embodiments.

FIG. 3 illustrates an exemplary series of communications between video-platform server 200, partner device 110, and media-playback device 105 that illustrate certain aspects of a platform, in accordance with one or more embodiments.

Beginning the illustrated series of communications, media-playback device 105 sends to partner device 110 a request 303 for a content page hosted or otherwise provided by partner device 110, the content page including context-aware video playback and interaction facilities. Partner device 110 processes 305 the request and sends to media-playback device 105 data 308 corresponding to the requested content page, the data including one or more references (e.g. a uniform resource locator or "URL") to scripts or similarly functional resources provided by video-platform server 200.

For example, in one embodiment, data 308 may include a page of hypertext markup language ("HTML") including an HTML tag similar to the following.

<script id="cvp_sdk" type="text/javascript" src="http://cvp-web.videoplatform.com/public/sdk/v1/cvp_sdk.js"></script>

Using the data 308 provided by partner device 110, media-playback device 105 begins the process of rendering 310 the content page, in the course of which, media-playback device 105 sends to video-platform server 200 a request 313 for one or more scripts or similarly functional resources referenced in data 308. Video-platform server 200 sends 315 the requested script(s) or similarly functional resource(s) to media-playback device 105 for processing 318 in the course of rendering the content page.

For example, in one embodiment, media-playback device 105 may instantiate one or more software objects that expose properties and/or methods by which media-playback device 105 may access a contextual-video application programming interface ("API") provided by video-platform server 200. In such embodiments, such an instantiated software object may mediate some or all of the subsequent communication between media-playback device 105 and video-platform server 200 as described below.

While still rendering the content page, media-playback device 105 sends to video-platform server 200 a request 320 for scripts or similarly functional resources and/or data to initialize a user interface ("UI") "widget" for controlling the playback of and otherwise interacting with a media file displayed on the content page. The term "widget" is used herein to refer to a functional element (e.g., a UI, including one or more controls) that may be instantiated by a web browser or other application on a media-playback device to enable functionality such as that described herein.

Video-platform server 200 processes 323 the request and sends to media-playback device 105 data 325, which media-playback device 105 processes 328 to instantiate the requested UI widget(s). For example, in one embodiment, the instantiated widget(s) may include playback controls to enable a user to control playback of a media file. Media-playback device 105 obtains, via the instantiated UI widget(s), an indication 330 to begin playback of a media file on the content page. In response, media-playback device 105 sends to partner device 110 a request 333 for renderable media data corresponding to at least a segment of the media file. Partner device 110 processes 335 the request and sends to media-playback device 105 the requested renderable media data 338.

Typically, renderable media data includes computer-processable data derived from a digitized representation of a piece of media content, such as a video or other multimedia presentation. The renderable media data send to media-playback device 105 may include less than all of the data required to render the entire duration of the media presentation. For example, in one embodiment, the renderable media data may include a segment (e.g. 30 or 60 seconds) within a longer piece of content (e.g., a 22 minute video presentation).

In other embodiments, the renderable media data may be hosted by and obtained from a third party media hosting service, such as YouTube.com, provided by Google, Inc. of Menlo Park, Calif. ("YouTube").

In the course or preparing to render the media data, media-playback device 105 sends to video-platform server 200 a request 340 for a list of asset identifiers identifying assets that are depicted in or otherwise associated with a given segment of the media presentation. In response, video-platform server 200 identifies 343 one or more asset tags corresponding to assets that are depicted in or otherwise associated with the media segment.

As the term is used herein, "assets" refer to objects, items, actors, and other entities that are depicted in or otherwise associated with a video segment. For example, within a given 30-second scene, the actor "Art Arterton" may appear during the time range from 0-15 seconds, the actor "Betty Bing" may appear during the time range 12-30 seconds, the song "Pork Chop" may play in the soundtrack during the time range from 3-20 seconds, and a particular laptop computer may appear during the time range 20-30 seconds. In various embodiments, some or all of these actors, songs, and objects may be considered "assets" that are depicted in or otherwise associated with the video segment.

Video-platform server 200 sends to media-playback device 105 a list 345 of identifiers identifying one or more asset tags corresponding to one or more assets that are depicted in or otherwise associated with the media segment. For some or all of the identified asset tags, media-playback device 105 sends to video-platform server 200 a request 348 for asset "tags" corresponding to the list of identifiers.

As the term is used herein, an asset "tag" refers to a data structure including an identifier and metadata describing an asset's relationship to a given media segment. For example, an asset tag may specify that a particular asset is depicted at certain positions within the video frame at certain times during presentation of a video.

Video-platform server 200 obtains 350 (e.g., from database 260) the requested asset tag metadata and sends 353 it to media-playback device 105. For example, in one embodiment, video-platform server 200 may send one or more data structures similar to the following.

Asset ID: d13b7e51ec93
Media ID: 5d0b431d63f1
Asset Type: Person
AssetControl: /asset/d13b7e51ec93/thumbnail.jpg
Asset Context Data: "http://en.wikipedia.org/wiki/Art_Arterton"
Time Start: 15
Time End: 22.5
Coordinates: [0.35, 0.5]

To facilitate human comprehension, this and other example data objects depicted herein are presented according to version 1.2 of the YAML "human friendly data serialization standard", specified at http://www.yaml.org/spec/1.2/spec.html. In practice, data objects may be serialized for storage and/or transmission into any suitable format (e.g., YAML, JSON, XML, BSON, Property Lists, or the like).

Using the data thereby provided, media-playback device 105 plays 355 the video segment, including presenting asset metadata about assets that are currently depicted in or otherwise associated with the media segment.

In the course of playing the video segment, media-playback device 105 obtains an indication 358 that a user has interacted with a tagged asset. For example, in some embodiments, media-playback device 105 may obtain an indication from an integrated touchscreen, mouse, or other pointing and/or selection device that the user has touched, clicked-on, or otherwise selected a particular point or area within the rendered video frame.

Media-playback device 105 determines 360 (e.g., using asset-position tag metadata) that the interaction event corresponds to a particular asset that is currently depicted in or otherwise associated with the media segment, and media-playback device 105 sends to video-platform server 200 a request 363 for additional metadata associated with the interacted-with asset.

Video-platform server 200 obtains 365 (e.g. from database 260) additional metadata associated with the interacted-with asset and sends the metadata 368 to media-playback device 105 for display 370. For example, in one embodiment, such additional metadata may include detailed information about an asset, and may include URLs or similar references to external resources that include even more detailed information.

Figure 4:
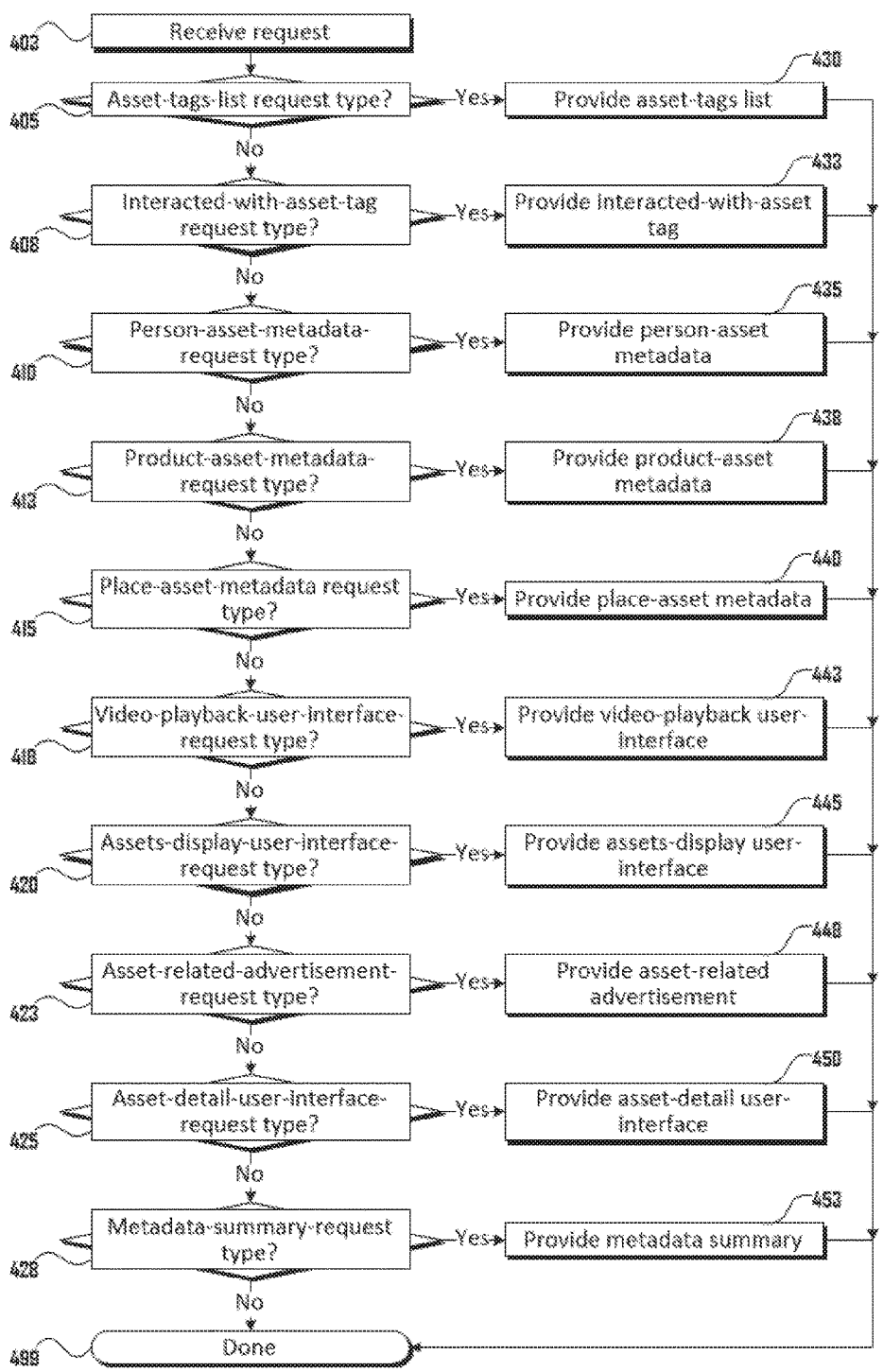
FIG. 4 illustrates a routine for providing a platform API, such as may be performed by a video-platform server in accordance with one or more embodiments.

FIG. 4 illustrates a routine 400 for providing a platform API, such as may be performed by a video-platform server 200 in accordance with one or more embodiments.

In block 403, routine 400 receives a request from a media-playback device 105. In various embodiments, routine 400 may accept requests of a variety of request types, similar to (but not limited to) those described below. The examples provided below use Javascript syntax and assume the existence of an instantiated platform ("CVP") object in a web browser or other application executing on a remote client device.

In decision block 405, routine 400 determines whether the request (as received in block 403) is of an asset-tags-list request type. If so, then routine 400 proceeds to block 430. Otherwise, routine 400 proceeds to decision block 408.

For example, in one embodiment, routine 400 may receive a request based on a remote-client invocation of a method that is used to retrieve the video tags for the specified time period for a video id and distributor account id, such as a "get_tag_data" method (see, e.g., Appendix F). In such an embodiment, the remote client may send the request by invoking the method with parameters similar to some or all of the following.

CVP.get_tag_data(video_id, start_time, end_time, dist_id, callback, parse_json)

Responsive to the asset-tags-list request received in block 403 and the determination made in decision block 405, routine 400 provides the requested asset-tags list to the requesting device in block 430.

For example, in one embodiment, routine 400 may provide data such as that shown in Appendix F.

In decision block 408, routine 400 determines whether the request (as received in block 403) is of an interacted-with-asset-tag request type. If so, then routine 400 proceeds to block 433. Otherwise, routine 400 proceeds to decision block 410.

For example, in one embodiment, routine 400 may receive a request based on a remote-client invocation of a method that is used to retrieve the asset information around a user click/touch event on the remote client, such as a "get_tag_from_event" method (see, e.g., Appendix G). In such an embodiment, the remote client may send the request by invoking the method with parameters similar to some or all of the following.

CVP.get_tag_from_event(dist_id, video_id, time, center_x, center_y, callback, parse_json)

Responsive to the interacted-with-asset-tag request received in block 403 and the determination made in decision block 408, routine 400 provides the requested interacted-with-asset tag to the requesting device in block 433.

For example, in one embodiment, routine 400 may provide data such as that shown in Appendix G.

In decision block 410, routine 400 determines whether the request (as received in block 403) is of a person-asset-metadata-request type. If so, then routine 400 proceeds to block 435. Otherwise, routine 400 proceeds to decision block 413.

For example, in one embodiment, routine 400 may receive a request based on a remote-client invocation of a method that is used to retrieve the asset information for a person asset id and distributor account id, such as a "get_person_data" method (see, e.g., Appendix C). In such an embodiment, the remote client may send the request by invoking the method with parameters similar to some or all of the following.

CVP.get_person_data(person_id, dist_id, callback, parse_json)

Responsive to the person-asset-metadata request received in block 403 and the determination made in decision block 410, routine 400 provides the requested person-asset metadata to the requesting device in block 435.

For example, in one embodiment, routine 400 may provide data such as that shown in Appendix C.

In decision block 413, routine 400 determines whether the request (as received in block 403) is of a product-asset-metadata-request type. If so, then routine 400 proceeds to block 438. Otherwise, routine 400 proceeds to decision block 415.

For example, in one embodiment, routine 400 may receive a request based on a remote-client invocation of a method that is used to retrieve the asset information for a product asset id and distributor account id, such as a "get_product_data" method (see, e.g., Appendix D). In such an embodiment, the remote client may send the request by invoking the method with parameters similar to some or all of the following.

CVP.get_product_data(product_id, dist_id, callback, parse_json)

Responsive to the product-asset-metadata request received in block 403 and the determination made in decision block 413, routine 400 provides the requested product-asset metadata to the requesting device in block 438.

For example, in one embodiment, routine 400 may provide data such as that shown in Appendix D.

In decision block 415, routine 400 determines whether the request (as received in block 403) is of a place-asset-metadata request type. If so, then routine 400 proceeds to block 440. Otherwise, routine 400 proceeds to decision block 418.

For example, in one embodiment, routine 400 may receive a request based on a remote-client invocation of a method that is used to retrieve the asset information for a place asset id and for a distributor account id, such as a "get_place_data" method (see, e.g., Appendix E). In such an embodiment, the remote client may send the request by invoking the method with parameters similar to some or all of the following.

CVP.get_place_data(place_id, dist_id, callback, parse_json)

Responsive to the place-asset-metadata request received in block 403 and the determination made in decision block 415, routine 400 provides the requested place-asset metadata to the requesting device in block 440.

For example, in one embodiment, routine 400 may provide data such as that shown in Appendix E.

In decision block 418, routine 400 determines whether the request (as received in block 403) is of a video-playback-user-interface-request type. If so, then routine 400 proceeds to block 443. Otherwise, routine 400 proceeds to decision block 420.

For example, in one embodiment, routine 400 may receive a request based on a remote-client invocation of a method that initializes the remote client & adds necessary event listeners for the player widget, such as an "init_player" method (see, e.g., Appendix AF). In such an embodiment, the remote client may send the request by invoking the method with parameters similar to some or all of the following.

CVP.init_player( )

For example, in another embodiment, routine 400 may receive a request based on a remote-client invocation of a method that initializes the video meta data, assets and tags data and exposes them as global CVP variables (CVP.video_data, CVP.assets,CVP.tags), such as an "init_data" method (see, e.g., Appendix R). In such an embodiment, the remote client may send the request by invoking the method with parameters similar to some or all of the following.

CVP.init_data(videoid, distributionid)

Responsive to the video-playback-user-interface request received in block 403 and the determination made in decision block 418, routine 400 provides the requested video-playback-user interface to the requesting device in block 443.

In decision block 420, routine 400 determines whether the request (as received in block 403) is of an assets-displayuser-interface-request type. If so, then routine 400 proceeds to block 445. Otherwise, routine 400 proceeds to decision block 423.

For example, in one embodiment, routine 400 may receive a request based on a remote-client invocation of a method that initializes & adds necessary event listeners and displays the reel widget, such as an "init_reel_widget" method (see, e.g., Appendix W). In such an embodiment, the remote client may send the request by invoking the method with parameters similar to some or all of the following.

CVP.init_reel_widget(parent_id)

For example, in another embodiment, routine 400 may receive a request based on a remote-client invocation of a method that creates/displays slivers based on the remote client current time, such as a "new_sliver" method (see, e.g., Appendix X). In such an embodiment, the remote client may send the request by invoking the method with parameters similar to some or all of the following.

CVP.new_sliver(player_time)

Responsive to the assets-display-user-interface request received in block 403 and the determination made in decision block 420, routine 400 provides the requested assets-display-user interface to the requesting device in block 445.

In decision block 423, routine 400 determines whether the request (as received in block 403) is of an asset-related-advertisement-request type. If so, then routine 400 proceeds to block 448. Otherwise, routine 400 proceeds to decision block 425.

For example, in one embodiment, routine 400 may receive a request based on a remote-client invocation of a method that is used to retrieve advertisement for an asset which has an ad campaign associated with it, such as a "get_advertisement" method (see, e.g., Appendix H). In such an embodiment, the remote client may send the request by invoking the method with parameters similar to some or all of the following.

CVP.get_advertisement(dist_id, campaign_id, zone_id, callback)

Responsive to the asset-related-advertisement request received in block 403 and the determination made in decision block 423, routine 400 provides the requested asset-related advertisement to the requesting device in block 448.

In decision block 425, routine 400 determines whether the request (as received in block 403) is of an asset-detail-user-interface-request type. If so, then routine 400 proceeds to block 450. Otherwise, routine 400 proceeds to decision block 428.

For example, in one embodiment, routine 400 may receive a request based on a remote-client invocation of a method that initializes & adds necessary event listeners for the details widget, such as an "init_details_panel" method (see, e.g., Appendix AC). In such an embodiment, the remote client may send the request by invoking the method with parameters similar to some or all of the following.

CVP.init_details_panel(parent_id)

For example, in another embodiment, routine 400 may receive a request based on a remote-client invocation of a method that displays detailed information on an asset. It also displays several tabs like wiki, twitter etc. to pull more information on the asset from other external resources, such as a "display_details_panel" method (see, e.g., Appendix AD). In such an embodiment, the remote client may send the request by invoking the method with parameters similar to some or all of the following.

CVP.display_details_panel(asset_id, campaign_id)

Responsive to the asset-detail-user-interface request received in block 403 and the determination made in decision block 425, routine 400 provides the requested asset-detail-user interface to the requesting device in block 450.

In decision block 428, routine 400 determines whether the request (as received in block 403) is of a metadata-summary-request type. If so, then routine 400 proceeds to block 450. Otherwise, routine 400 proceeds to ending block 499.

For example, in one embodiment, routine 400 may receive a request based on a remote-client invocation of a method that is used to get the video metadata summary for a video id and distributor account id, such as a "get_video_data" method (see, e.g., Appendix B). In such an embodiment, the remote client may send the request by invoking the method with parameters similar to some or all of the following.

CVP.get_video_data(video_id, dist_id, callback, parse_json)

Responsive to the metadata-summary request received in block 403 and the determination made in decision block 428, routine 400 provides the requested metadata summary to the requesting device in block 450.

For example, in one embodiment, routine 400 may provide data such as that shown in Appendix B.

Routine 400 ends in ending block 499.

Figure 5:
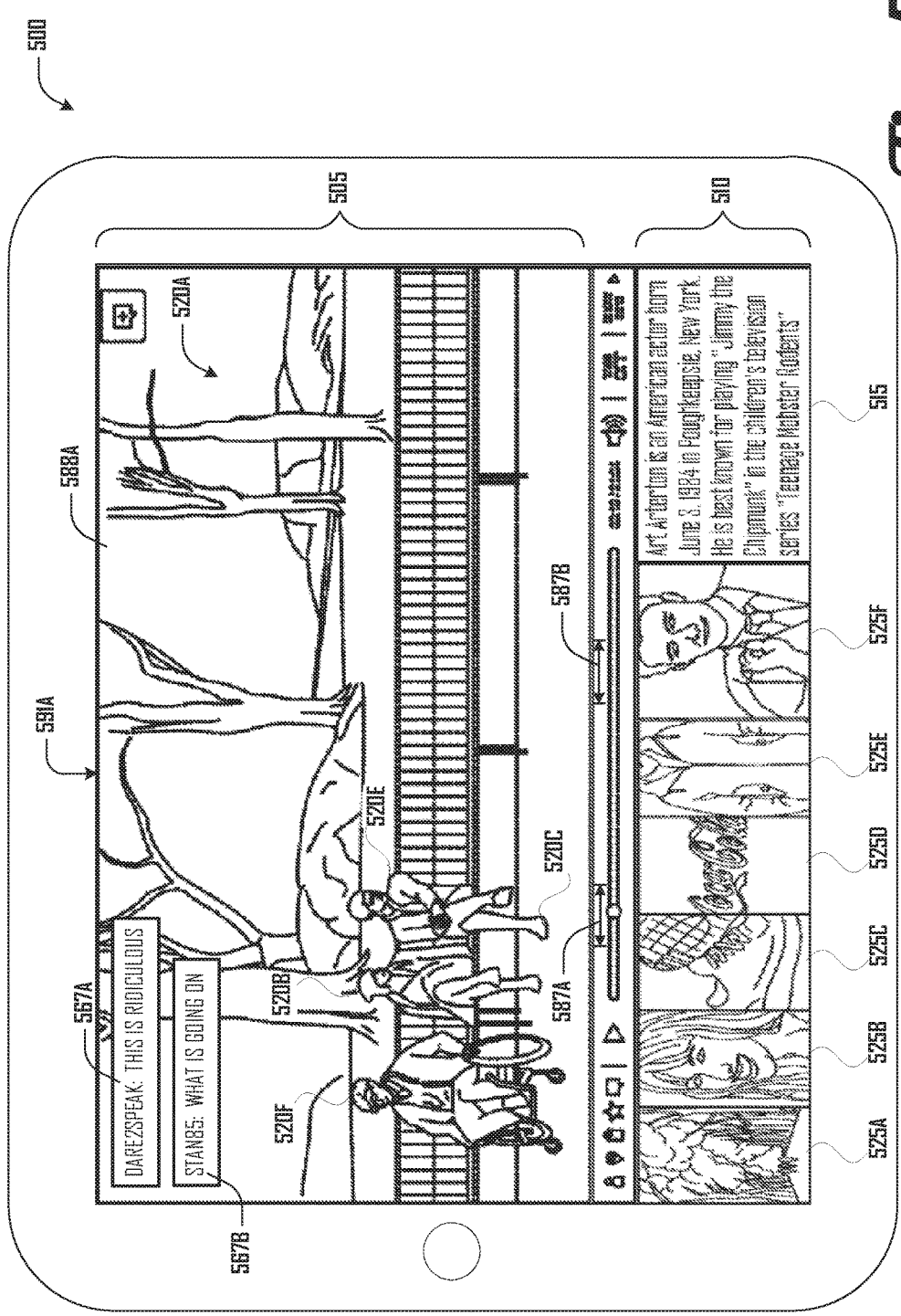
FIG. 5 illustrates an exemplary context-aware media-rendering UI, such as may be provided by video-platform server and generated by media-playback device in accordance with one or more embodiments.

FIG. 5 illustrates an exemplary context-aware media-rendering UI, such as may be provided by video-platform server 200 and generated by media-playback device 105 in accordance with one or more embodiments.

UI 500 includes media-playback widget 505, in which renderable media data is rendered. The illustrated media content presents a scene in which three individuals are seated on or near a bench in a park-like setting. Although not apparent from the illustration, the individuals in the rendered scene may be considered for explanatory purposes to be discussing popular mass-market cola beverages.

UI 500 also includes assets widget 510, in which currently-presented asset controls 525A-F are displayed. In particular, asset control 525A corresponds to location asset 520A (the park-like location in which the current scene takes place). Similarly, asset control 525B and asset control 525F correspond respectively to person asset 520B and person asset 520F (two of the individuals currently presented in the rendered scene); asset control 525C and asset control 525E correspond respectively to object asset 520C and object asset 520E (articles of clothing worn by an individual currently presented in the rendered scene); and asset control 525D corresponds to object asset 520D (the subject of a conversation taking place in the currently presented scene).

The illustrated media content also presents other elements (e.g., a park bench, a wheelchair, et al) that are not represented in assets widget 510, indicating that those elements may not be associated with any asset metadata.

Assets widget 510 has been configured to present context-data display 515. In various embodiments, such a configuration may be initiated if the user activates an asset control (e.g., asset control 525F) and/or selects an asset (e.g., person asset 520F) as displayed in media-playback widget 505. In some embodiments, context-data display 515 or a similar widget may be used to present promotional content while (at least an areal portion 588A of) the video is rendered in media-playback widget 505.

Also within an outer frame 591A of widget 505 are a visible expression stating "this is ridiculous" in a first viewing area 567A and a visible expression stating "what is going on" in a second viewing area 567B. As described in further detail below, such viewing areas 567 and expressions may appear in particular sequential positions 587A-B (scenes, depictions, time intervals, segments, e.g.) of a video or other presentation to which people known to the viewer are reacting. This can occur, for example, in a context in which such items appear as an automatic and conditional response to the person viewing UI 500 authorizing an individual connection (as a connection, follow, friend request or grant on a social media platform, e.g.) and to the other person (having a username of "DARE2SPEAK" or "STAN85," e.g.) having provided such annotation in an earlier viewing of that sequential position 587A. Alternatively or additionally, such configuration changes are confirmed or deactivated in response to the present viewer's expressed preferences. This can occur, for example, in a context in which the present viewer has been offered an opportunity to confirm an annotation request in a "manage connection" or similar menu option or in which the present viewer has been offered an opportunity to deactivate the annotation request in a "don't show reactions from STAN85" or similar menu option that appears in a pop-up menu when viewing area 567B is selected; and in which such deactivation would otherwise require the present viewer to sever the social media linkage completely. (As used herein, the term "outer frame" is never used to describe an outline of an entire display screen but rather refers to a visible or other outline of a subset of the display screen within which a viewable presentation occurs.)

Figure 6:
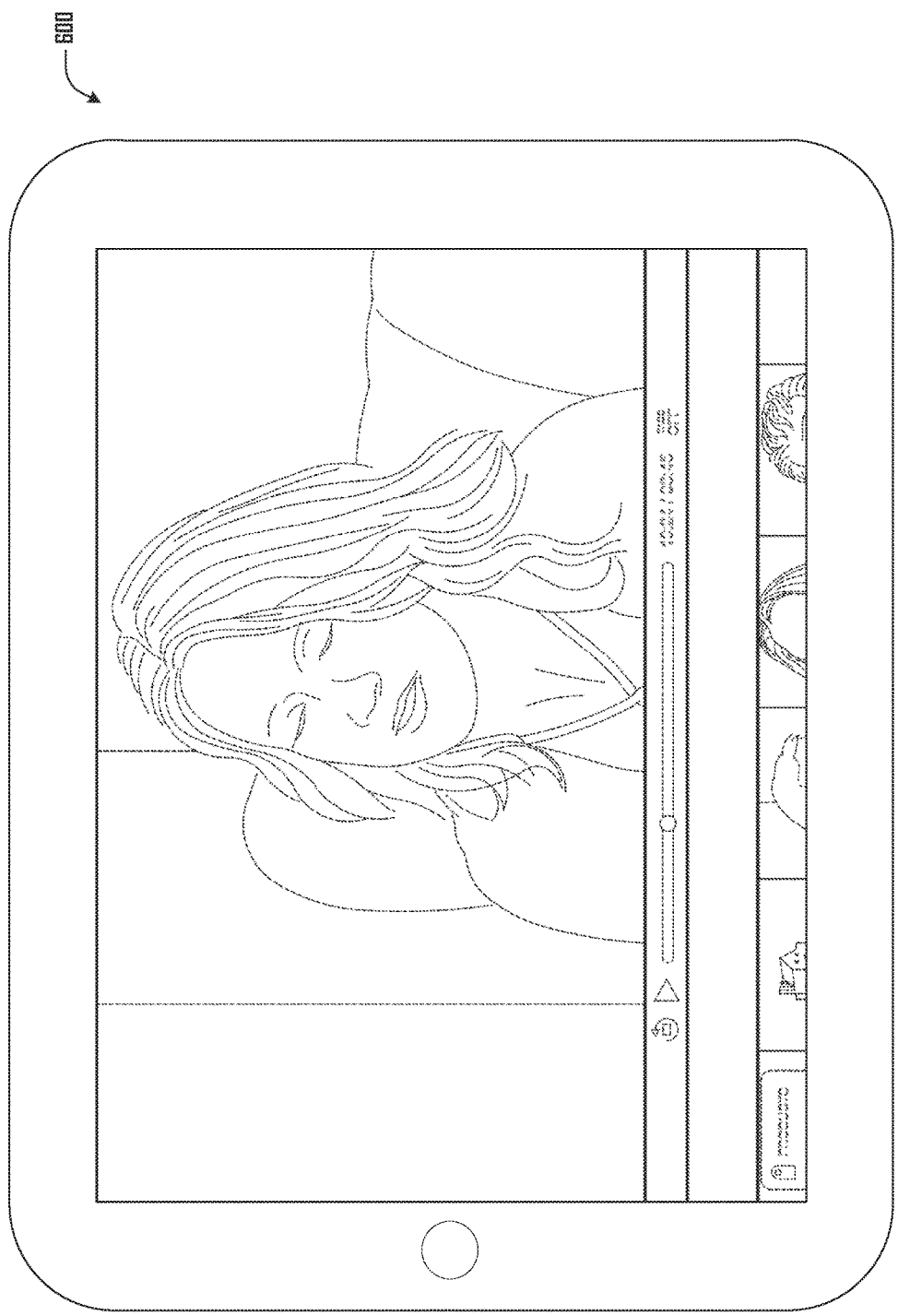
FIGS. 6-11 illustrate an exemplary context-aware media-rendering UI, such as may be provided by video-platform server and generated by media-playback device in accordance with one or more embodiments.

FIG. 6 illustrates an exemplary context-aware media-rendering UI, such as may be provided by video-platform server 200 and generated by media-playback device 105 in accordance with one or more embodiments.

Figure 7:
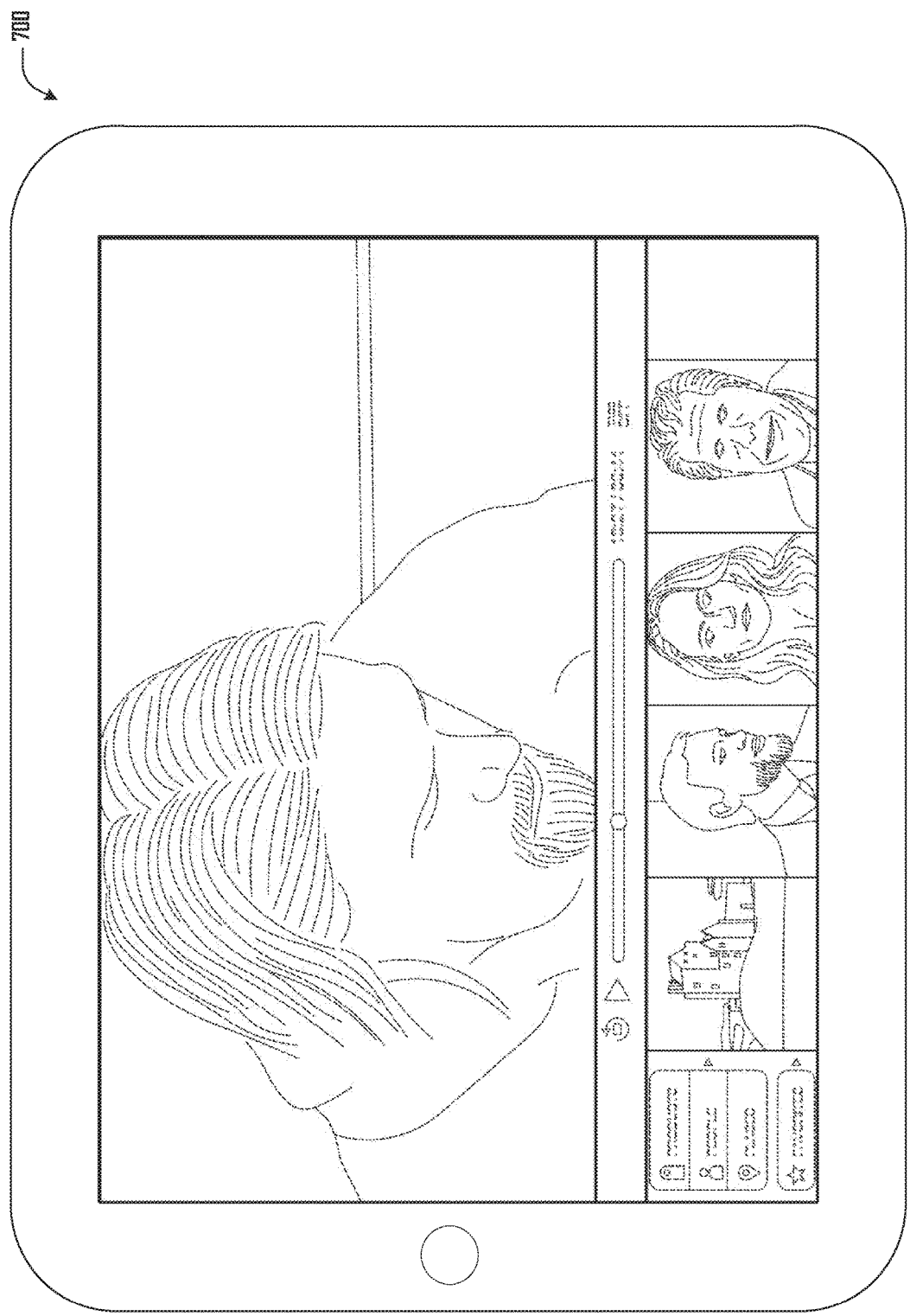

FIG. 7 illustrates an exemplary context-aware media-rendering UI, such as may be provided by video-platform server 200 and generated by media-playback device 105 in accordance with one or more embodiments.

Figure 8:
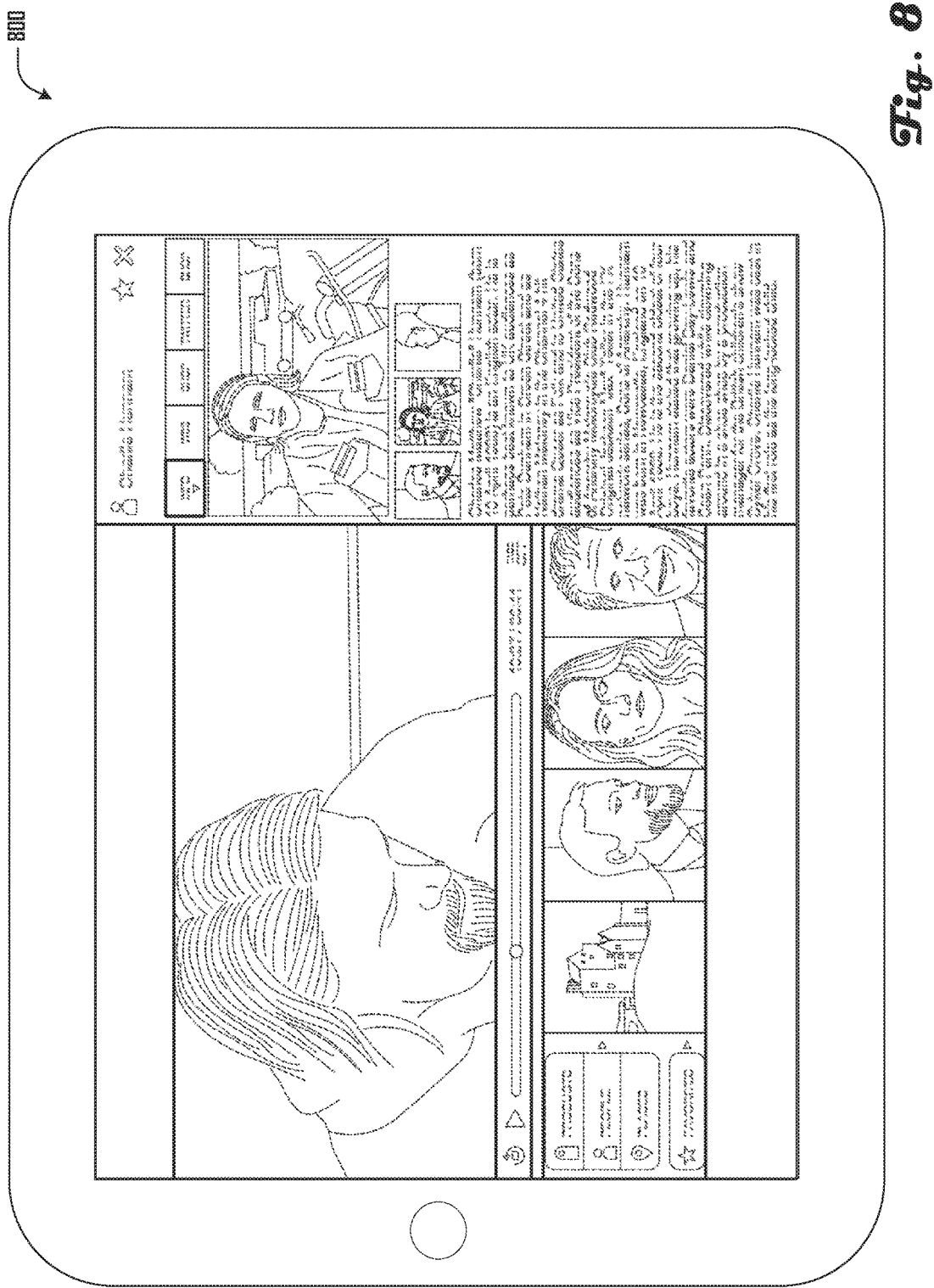

FIG. 8 illustrates an exemplary context-aware media-rendering UI, such as may be provided by video-platform server 200 and generated by media-playback device 105 in accordance with one or more embodiments.

Figure 9:
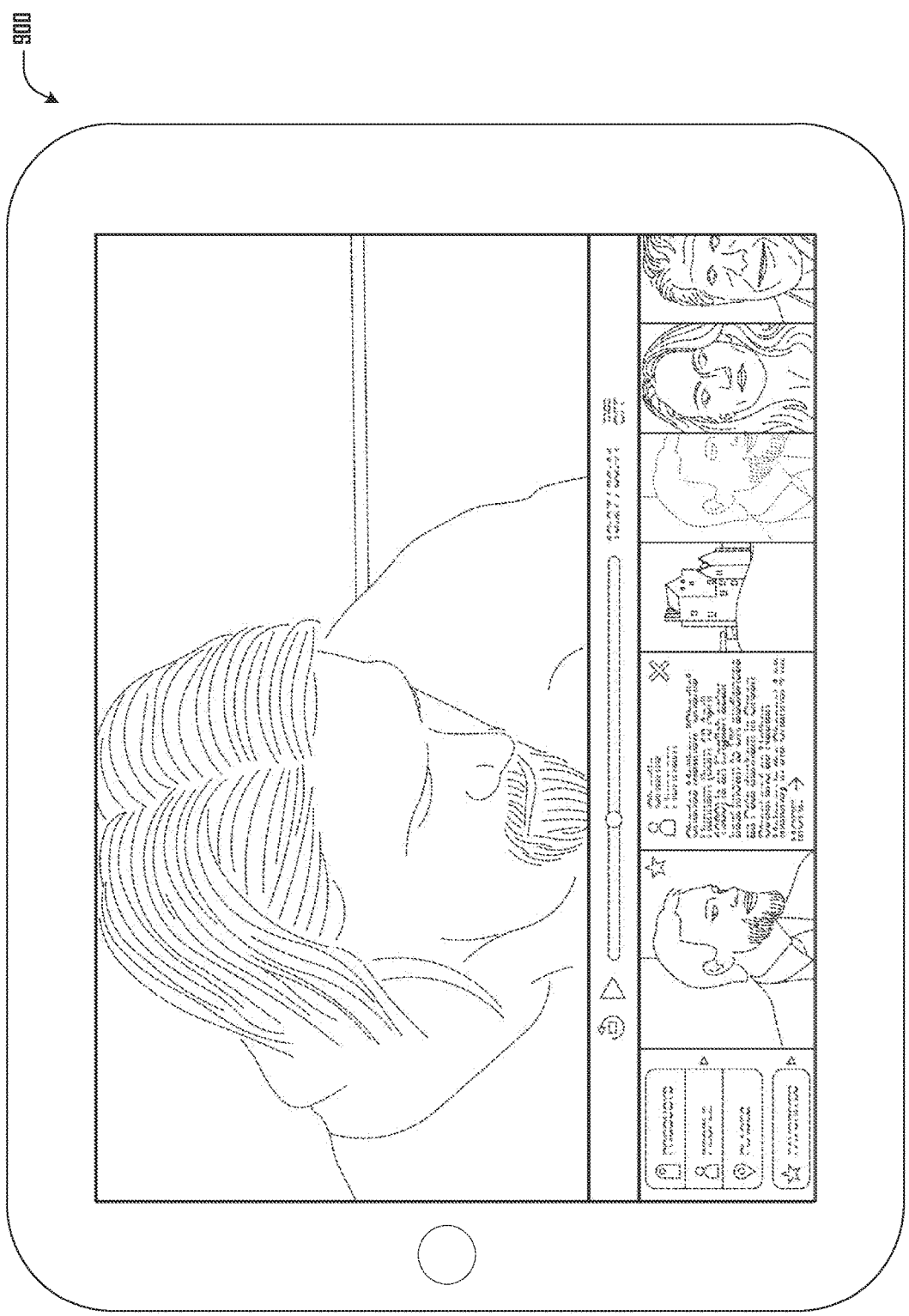

FIG. 9 illustrates an exemplary context-aware media-rendering UI, such as may be provided by video-platform server 200 and generated by media-playback device 105 in accordance with one or more embodiments.

Figure 10:
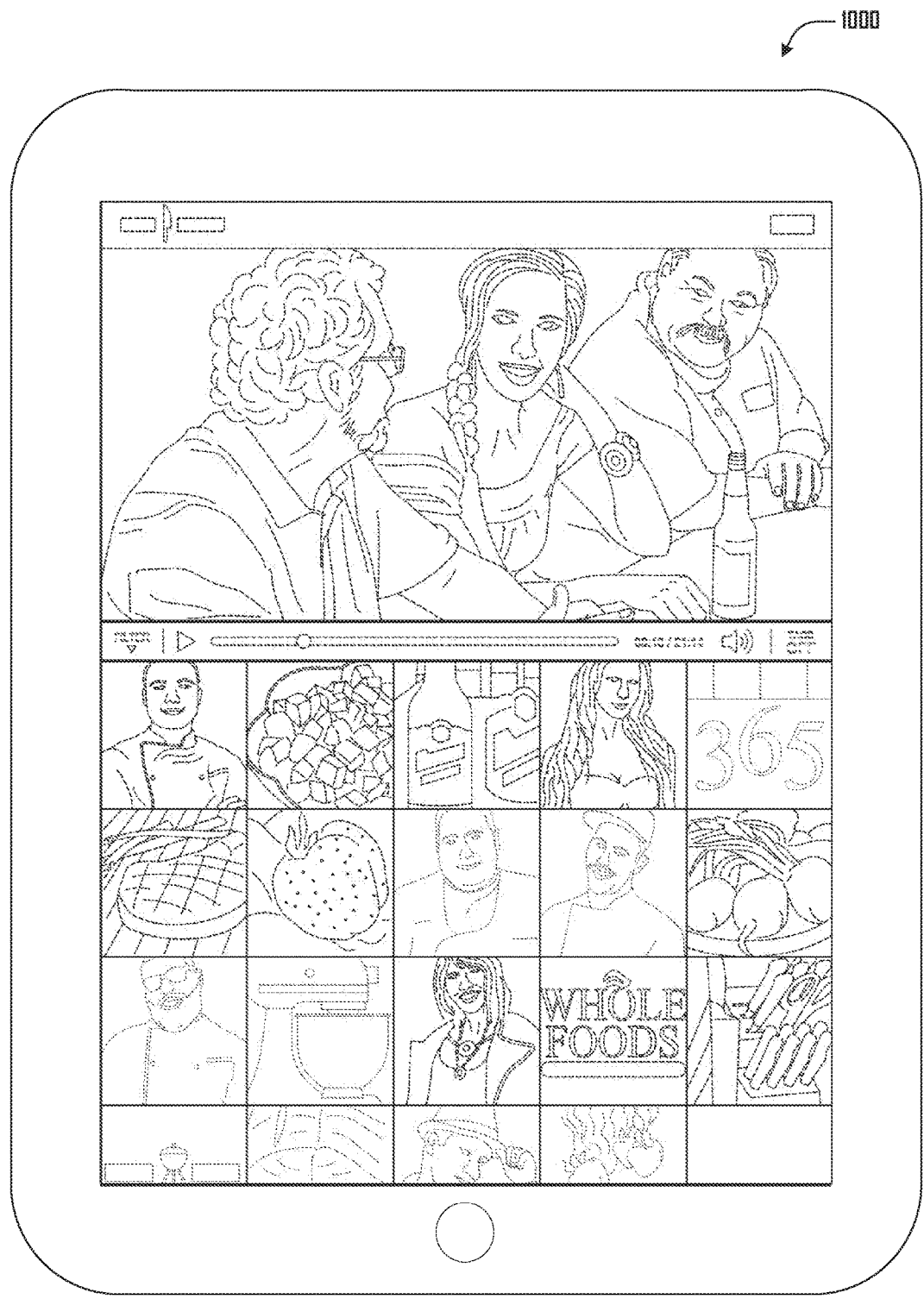

FIG. 10 illustrates an exemplary context-aware media-rendering UI, such as may be provided by video-platform server 200 and generated by media-playback device 105 in accordance with one or more embodiments.

Figure 11:
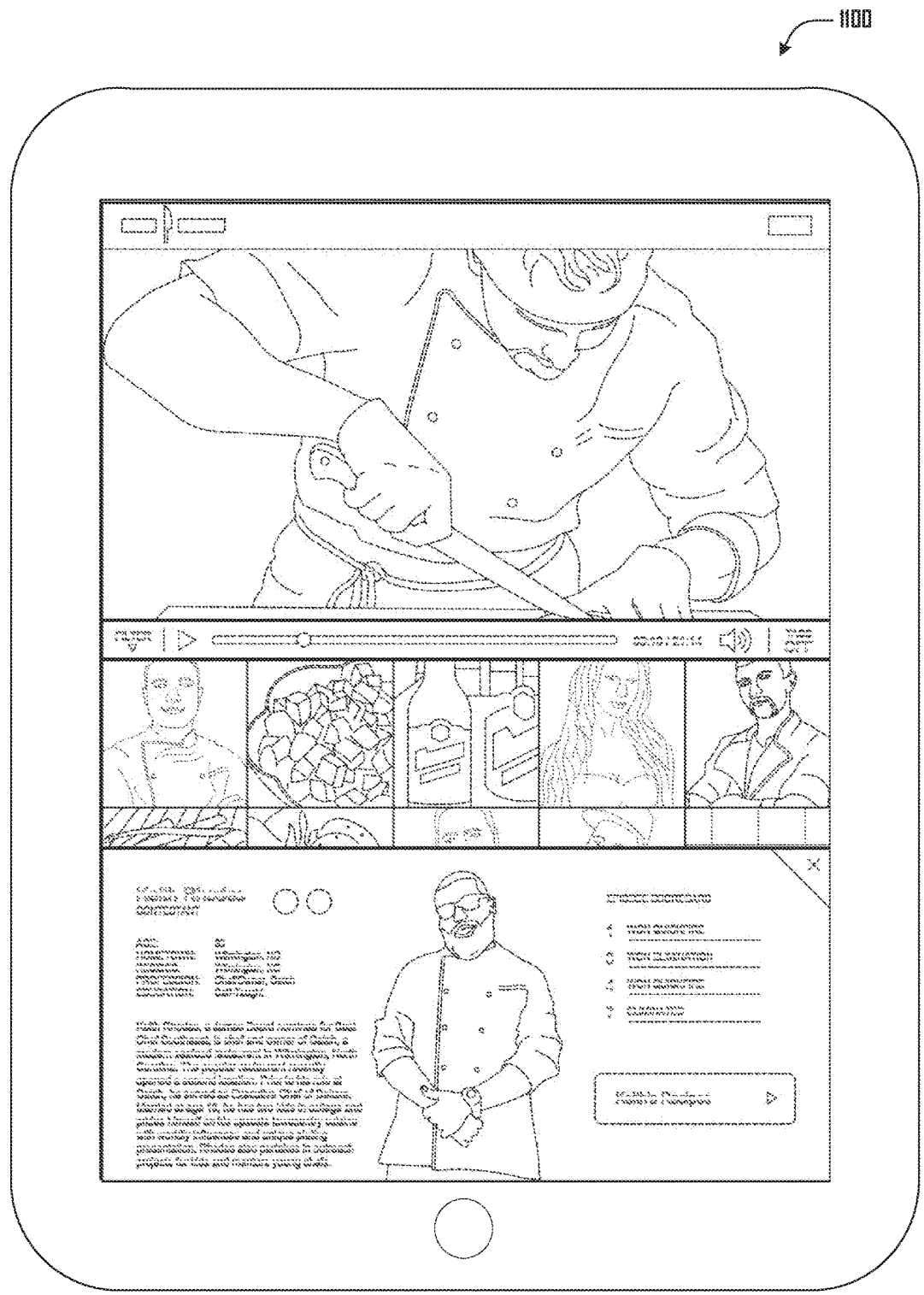

FIG. 11 illustrates an exemplary context-aware media-rendering UI, such as may be provided by video-platform server 200 and generated by media-playback device 105 in accordance with one or more embodiments.

Figure 12:
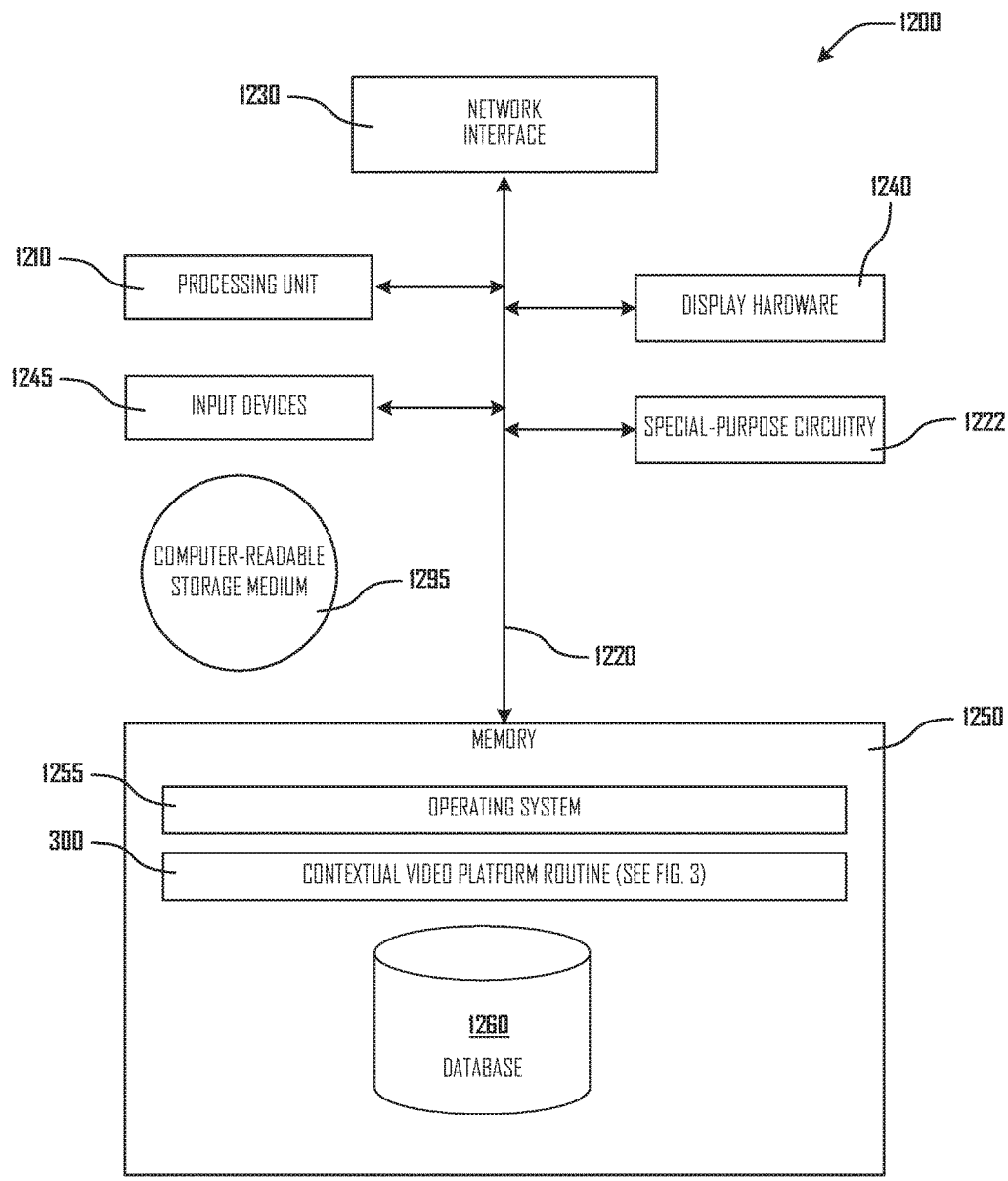
FIG. 12 illustrates several components of an exemplary client device in accordance with one or more embodiments.

FIG. 12 illustrates several components of an exemplary video-platform client in accordance with one or more embodiments. In some embodiments, video-platform client 1200 may include many more components than those shown in FIG. 12. However, it is not necessary that all of these generally conventional components be shown in order to disclose an illustrative embodiment.

Video-platform client 1200 includes a bus 1220 interconnecting components including one or more instances of processing units 1210; memory 1250; displays 1240; input devices 1245; or network interfaces 1230. Special-purpose circuitry 1222 may also be provided (configured to include one or more pattern recognition modules, user preference determination and implementation modules, or other such processing or decision modules, e.g.), as further described below (in conjunction with one or more of FIGS. 13-16, e.g.). In various embodiments, also, client 1200 may include one or more instances of a mouse, track pad, touch screen, haptic input device, a camera (webcam, e.g.), a pointing and/or selection device, or other such input devices 1245.

Memory 1250 generally comprises a random access memory ("RAM"), a read only memory ("ROM"), and a permanent mass storage device, such as a disk drive. The memory 1250 stores program code for a routine 400 for providing various functions as described below (at FIGS. 14 and 16, e.g.). In addition, the memory 1250 also stores an operating system 1255.

These and other software components may be loaded into memory 1250 of video-platform client 1200 using a drive mechanism (not shown) associated with a non-transient computer readable storage medium 1295, such as a floppy disc, tape, DVD/CD-ROM drive, memory card, or the like. In some embodiments, software components may alternately be loaded via the network interface 1230, rather than via a non-transient computer readable storage medium 1295. Memory 1250 also includes database 1260, which stores records including records 1265A-D.

In some embodiments, video-platform client 1200 may communicate with database 1260 via network interface 1230, a storage area network ("SAN"), a high-speed serial bus, and/or via the other suitable communication technology.

In some embodiments, database 1260 may comprise one or more storage services like those described above with reference to FIG. 2.

FIG. 13 illustrates a distributed system 1300 (in a common network 150, e.g.) including or otherwise interacting with multiple client devices 1200A-C (each implementing a playback device 105 as described above, e.g.) with a succession of interactions or other sequenced events (in direct wireless communication or mediated by one or more servers 200, e.g.). In a preliminary occurrence (at a first viewing, e.g.), a camera (in a stationary mount or within client device 1200A, e.g.) obtains a visible expression of a "first" person 1 during a first sequential position 587 of a presentation (within part of a clip or episode, e.g.) via device 1200A.

In a somewhat delayed presentation of the first sequential position 587 (after the first viewing of the presentation, e.g.), a second viewing occurs at which at least a second person 2 attends. The second viewing includes a display of (a version of) at least an areal portion 588B of the same presentation (at least including a second device 1200B presenting the first sequential position 587, e.g.) that is played simultaneously with the (captured) visible expression of the first person 1 made earlier. This can occur, for example, in a context in which the expression includes a verbal or other orally articulated expression that includes a visible component (shown within a viewing area 567C, e.g.) at least partly within an outer frame of the presentation. Alternatively or additionally, the first person's visible expression may include other gestures to which the second person may react.

In a more delayed occurrence, a third viewing occurs at which at least a third person 3 attends. The third viewing includes a display of (some or all of) the same presentation (including third device 1200C presenting at least the first sequential position 587, e.g.) that is played simultaneously with the (captured) visible expression of one or both of the other persons 1,2. This can occur, for example, in a context in which the selected expression includes a visible component (shown within a viewing area 567D, e.g.) at least partly within an outer frame 591B of the presentation and in which a large areal portion 588C of the presentation is shown at the same time. In some variants, one or more user preferences (of the user, person 3, e.g.) or other such determinants (which of persons 1,2 has more social media linkages, which expression includes more movement or attracts more signals of approval (votes or likes, e.g.), which expression provider attracts more followers or friends or connections, e.g.) are used as determinants that affect which available expression(s) associated with that sequential position 587 are used for enriching the third viewing.

FIG. 14 illustrates an operational flow 1400 in which one or more technologies may be implemented (within or in conjunction with client devices 1200A-C, e.g.). At operation 1430, a first visible expression is captured at a first sequential position within a presentation during a first viewing of the presentation (one or more invocation or capture modules of special-purpose circuitry 222, 1222 triggering a camera in or near device 1200A to capture a visible expression of person 1 made during a scary scene of a movie, e.g.). This can occur, for example, in a context in which the "first sequential position" at least roughly coincides with the scary scene and in which person 1 makes a device-recognizable visible expression of alarm (jumping or making a sudden loud utterance, e.g.).

At operation 1445, the first sequential position within the presentation is played back with a viewing area presented at least partly within an outer frame of the presentation, attended at least by a second person (one or more invocation or capture modules of special-purpose circuitry 222, 1222 triggering playback of at least the same scary scene with some of the space within an outer frame 591 allocated for presenting the expression of person 1 to person 2, e.g.). This can occur, for example in a context in which the second viewing is more than a day (and optionally more than a month) after the first viewing, in which the persons 1,2 share a social media linkage, in which no effort is made to synchronize the viewings, and in which the first expression would otherwise be unknown to the second person 2 and not recorded. In some contexts, for example, the first expression may be recorded and survive beyond the lifespan of the first person 1.

At operation 1460, a visible expression of the second person is captured at the first sequential position within the presentation during the second viewing of the presentation attended at least by the second person (one or more invocation or capture modules of special-purpose circuitry 222, 1222 triggering a camera in or near device 1200B to capture a visible expression of person 2 made during the same scary scene, e.g.). This can occur, for example in a context in which person 2 is primarily reacting to the expression of person 1; in which both the portion of the presentation and the visible expression of the first person made at the first sequential position during the first viewing of the presentation are shown simultaneously; in which operations 1445, 1460 are performed concurrently; and in which both the first and second expressions are available to one or more modules that perform operation 1475.

At operation 1475, both a portion of the presentation and the visible expression of the second person made during the second viewing of the presentation at least partly within the outer frame of the presentation are presented simultaneously in a third viewing (one or more invocation or capture modules of special-purpose circuitry 222, 1222 triggering a playback of the scary scene via device 1200C with at least the visible expression of person 2 in a viewing area 567D thereof to person 3, e.g.). This can occur, for example, in a context in which such inclusion (including the second expression, e.g.) is an automatic and conditional response to the third person 3 having individually established a social media linkage with the second person 2 (to the third person 3 having individually authorized a "connect" request or request grant, a subscription or membership request or grant, or other such connection individually identifying the second person 2, e.g.). In some variants, two or more such expressions in a provenance chain may both/all be included in the simultaneous presentation to person 3 irrespective of whether or not a social media linkage connects the first and third persons 1,3. Alternatively or additionally, one or more preferences of third person 3 or a later viewer (whether to prefer "long" or "short" provenance chains, e.g.) may affect the decision to include the first and second expressions. This can occur, for example, for a downstream viewer who manifests a preference for "short" provenance chains (smaller than a viewer-provided threshold N, where N is at least 3 and at most 10, e.g.) and thereby avoids the disruption of numerous people suddenly appearing and reacting to a scene. Alternatively or additionally, the inclusion determination module may be configured to allow a presentation area 567D large enough to show a plurality of expressions so that a later viewer's reaction to an early viewer (laughter by person 2 in response to a funny expression of fear by person 1, e.g.) is coherent and not distracting. In some variants, moreover, a responsive expression is presented time-shifted slightly earlier (by 100 to 800 milliseconds, e.g.). Such forward-shifting playback implementations may diminish an emotional attenuation that would otherwise result from normal human reaction times and thereby allow for longer provenance chains (including reactions of a succession of several persons 1-3 to a fourth viewer, e.g.).

FIG. 15 illustrates special-purpose transistor-based circuitry 1500—optionally implemented as an Application-Specific Integrated Circuit (ASIC), e.g.—in which some or all of the functional modules described below may be implemented. Transistor-based circuitry 1500 is an event-sequencing structure generally as described in U.S. Pat. Pub. No. 2015/0094046 but configured as described herein. Transistor-based circuitry 1500 includes one or more instances of logic modules 1521-1524, for example, each including an electrical node set 1531-1534 upon which informational data is represented digitally as a corresponding voltage configuration 1541-1544.

In the interest of concision and according to standard usage in information management technologies, the functional attributes of modules described herein are set forth in natural language expressions. It will be understood by those skilled in the art that such expressions (functions or acts recited in English, e.g.) adequately describe structures identified below so that no undue experimentation will be required for their implementation. For example, any records or other informational data identified herein may easily be represented digitally as a voltage configuration on one or more electrical nodes (conductive pads of an integrated circuit, e.g.) of an event-sequencing structure without any undue experimentation. Each electrical node is highly conductive, having a corresponding nominal voltage level that is spatially uniform generally throughout the node (within a device or local system as described herein, e.g.) at relevant times (at clock transitions, e.g.). Such nodes (lines on an integrated circuit or circuit board, e.g.) may each comprise a forked or other signal path adjacent one or more transistors. Moreover many Boolean values (yes-or-no decisions, e.g.) may each be manifested as either a "low" or "high" voltage, for example, according to a complementary metal-oxide-semiconductor (CMOS), emitter-coupled logic (ECL), or other common semiconductor configuration protocol. In some contexts, for example, one skilled in the art will recognize an "electrical node set" as used herein in reference to one or more electrically conductive nodes upon which a voltage configuration (of one voltage at each node, for example, with each voltage characterized as either high or low) manifests a yes/no decision or other digital data.

Transistor-based circuitry 1500 may further include one or more instances of visible human expressions 1575A-B that may each include one or more instances of textual identifiers 1571A-B (identifying "DARE2SPEAK" or "STAN85" as shown in FIG. 5 or other identifiers of human beings who make the expression, e.g.) each associated with one or more visible expressions (textual expressions 1572A-B or facial video 1573A-B that convey emotion or ideas of a person, e.g.) at particular parts of a presentation (a scene of a movie, e.g.). Although circuitry 1500 is exemplified as being in a single item (within special-purpose circuitry 222, e.g.) it will be understood that distributed instances of circuitry 1500 are likewise contemplated as described herein.

FIG. 16 illustrates an operational flow 1600 in which one or more technologies may be implemented (within or in conjunction with client devices 1200A-C, e.g.). At operation 1635, a first visible expression captured at a first sequential position within a presentation during a first viewing of the presentation is obtained (logic module 1521 obtaining reaction data of person 1 to a dramatic movie scene as shown in FIG. 13 resulting from an instance of operation 1430, e.g.). This can occur, for example, in a context in which textual identifier 1571A identifies the first person 1 and in which the first visible expression 1575A comprises a facial video 1573A that depicts an eye roll performed by person 1 upon viewing the dramatic scene and captured (as a voltage configuration 1541 on an electrical node set 1531, e.g.) by an input device 1245 of device 1200A.

At operation 1655, a visible expression of a second person captured at the first sequential position during a second viewing of the presentation is obtained (logic module 1522 obtaining reaction data of person 2 to the above-described dramatic movie scene resulting from an instance of operations 1445 and 1460, e.g.). This can occur, for example, in a context in which textual identifier 1571B identifies the second person 2, in which the second visible expression 1575B comprises a facial video 1573B that depicts an intense expression manifested by person 2 upon viewing first facial video 1573A with the dramatic scene with which that facial video 1573A coincided simultaneously; and in which the facial video 1573B is manifested as a voltage configuration 1542 on an electrical node set 1532, e.g.) by an input device 1245 of device 1200B or in a vicinity thereof.

At operation 1670, one of the first or second expressions is selected automatically in lieu of the other, the selection being based at least in part on one or more criteria that depend on input from a third person (logic module 1523 deciding upon expression 1575B in lieu of expression 1575A based on a ranking provided by person 3 signifying that visible expressions of person 2 are preferred over those of person 1 whenever available, e.g.). This can occur, for example, in a context in which the ranking is expressed as a voltage configuration 1543 on an electrical node set 1533 (listing social media connections of person 3 in descending order of expressive preference, e.g.) or in which some device-detectable content (adult language, e.g.) in an available-but-not-selected expression causes logic module 1523 to perform operation 1670 by omitting the offending expression. Alternatively or additionally, metadata about the expression (sound or picture quality thereof, e.g.) may be used as a factor in ranking two or more available expressions or in deciding whether or not to present one or more available expressions.

At operation 1685, some or all of the presentation is provided in a "third viewing" such that both a portion of the presentation and one or more expressions are shown simultaneously (an instance of logic module 1524 within or in communication with device 1200C triggering a playback of the presentation via display hardware 1240 at least to person 3 such that the selected expression 1575 and the dramatic scene with which it temporally coincides are shown in a manner that overlaps in time, e.g.). This can occur, for example, in a context in which operation 1685 includes an instance of operation 1475 or vice versa; in which a camera of device 1200C captures facial video 1573 of person 3 during that playback; and in which that video is manifested as a voltage configuration 1544 on an electrical node set 1534, e.g.) for viewing by a fourth person.

Appendices A-Q illustrate an exemplary set of methods associated with an exemplary Data Library Widget. In various embodiments, a data library widget (cvp_data_lib.js) provides APIs to invoke CVP Server-side APIs to get Video Information, Asset Data (Product, Place, People), Tag Data, Advertisement information and for Reporting.

Appendices R-V illustrate an exemplary set of methods associated with an exemplary Data Handler Widget. In various embodiments, a Data Handler widget invokes the public APIs defined in data library widget and exposes CVP methods and variables for accessing video metadata summary, asset and tags information.

Appendices W-Z, AA, and AB illustrate an exemplary set of methods associated with an exemplary Reel Widget. In various embodiments, a Reel widget displays the asset sliver tags based on current player time & features a menu to filter assets by Products, People & Places.

Appendices AC, AD, and AE illustrate an exemplary set of methods associated with an exemplary Details Widget. In various embodiments, a Details widget displays detailed information of an asset.

Appendices AF, AG, and AH illustrate an exemplary set of methods associated with an exemplary Player Widget. In various embodiments, a Player widget displays video player and controls (e.g., via HTML5). The init public method defined in cvp_sdk.js (Loading SDK) takes an input parameter (initParams) which specifies the widgets to initialize. To initialize the player widget, player_widget parameter should be set as follows to specify the type (html5), video id, distributor account id, media type and media key. Start time and end time are optional for seek/pause video at specified time intervals.

Appendices AI, AJ, AK, AL, and AM illustrate an exemplary set of methods associated with an exemplary Player Interface Widget. In various embodiments, a Player interface widget serves as an interface between the player and app, and defines the event listener functions for various events such as click, meta data has loaded, video ended, video error & time update (player current time has changed).

In light of teachings herein, numerous existing techniques may be applied for configuring special-purpose circuitry or other structures effective for obtaining and applying user preferences, recognition criteria; or other operational parameters as described herein without undue experimentation. See, e.g., U.S. Pat. No. 9,443,001 ("Method and system to curate media collections"); U.S. Pat. No. 9,367,572 ("Metadata-based file-identification systems and methods"); U.S. Pat. No. 9,135,278 ("Method and system to detect and select best photographs"); U.S. Pat. No. 8,718,256 ("Method and system for providing ring back tone played at a point selected by user"); U.S. Pat. No. 8,666,375 ("Customizable media auto-reply systems and methods"); U.S. Pat. No. 8,156,139 ("Media playing on a portable media player including shop and play remote media"); U.S. Pat. No. 7,987,280 ("System and method for locating and capturing desired media content from media broadcasts"); U.S. Pat. No. 7,882,034 ("Digital rights management for content rendering on playback devices"); U.S. Pat. No. 7,617,296 ("Data compilation system and method"); U.S. Pat. No. 7,461,055 ("Method and apparatus for recommending selections based on preferences in a multi-user system"); U.S. Pat. No. 7,430,506 ("Preprocessing of digital audio data for improving perceptual sound quality on a mobile phone"); and U.S. Pub. No. 2014/0053061 ("System for clipping web pages"). These documents are incorporated herein by reference to the extent not inconsistent herewith.

With respect to the numbered clauses and claims expressed below, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise. Also in the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Clauses 1. (Independent) A social-media-enhanced presentation method comprising:

invoking transistor-based circuitry (logic module 1521, e.g.) configured to obtain a visible expression 1575 (a reaction to one or more situations or events then depicted, e.g.) of a first person 1 captured at a first sequential position 587 (within 5 seconds of a scene or event, e.g.) within a presentation (a video clip, e.g.) during a first viewing of the presentation;

invoking transistor-based circuitry (logic module 1522, e.g.) configured to permit a second viewing (after the first viewing of the presentation and possibly without the first person 1 attending, e.g.) of the presentation (by streaming, downloading, or playing a version of the presentation via client device 1300B, e.g.) attended by a second person 2 with both an areal portion 588A of the presentation (i.e. occupying a majority of display area within an outer frame 591 of the presentation) and the visible expression 1575 of the first person 1 made at the first sequential position during the first viewing of the presentation shown simultaneously at least at the first sequential position (wherein "at" means within a margin of at most 5 seconds) as an automatic and conditional response to the second person 2 having authorized a reference to the first person 1 (as a "follow" request, a "connect" request or request grant, a subscription request or grant, or other social media connection, e.g.) before the second viewing is initiated, wherein the presentation includes at least some of an indicated video.

2. The method of any of the above METHOD CLAUSES, further comprising:

invoking transistor-based circuitry (logic module 1524, e.g.) configured to obtain a visible expression 1575 of the second person 2 captured at the first sequential position within the presentation during a second viewing of the presentation with both a portion of the presentation and the visible expression 1575 of the first person 1 made at the first sequential position during the first viewing of the presentation shown simultaneously; and invoking transistor-based circuitry configured to present both a portion of the presentation and a selected one of the visible expressions 1575 simultaneously during a third viewing of the presentation attended by a third person 3.

3. The method of METHOD CLAUSE 2, wherein the invoking transistor-based circuitry configured to present both the portion of the presentation and the selected one of the visible expressions 1575 simultaneously during the third viewing of the presentation attended by the third person 3 comprises:

invoking transistor-based circuitry configured to present both the portion of the presentation and the selected one of the visible expressions 1575 in lieu of the other one of the visible expressions 1575 during the third viewing of the presentation attended by the third person 3.

4. The method of METHOD CLAUSE 2, comprising:

invoking transistor-based circuitry configured to transmit a linkage request (as a "friend" request or "follow" request, e.g.) from the third person 3 to another of the persons 1, 2 as an authorization for a social media link; and invoking transistor-based circuitry configured to decide which from several visible expressions 1575 to present as a conditional response to the social media link.

5. The method of any of the above METHOD CLAUSES 2-4, further comprising:

invoking transistor-based circuitry configured to approve a linkage request to the third person 3 from another of the persons as an authorization for a social media link; and invoking transistor-based circuitry configured to decide which from several visible expressions 1575 to present as a conditional response to the social media link.

6. The method of any of the above METHOD CLAUSES, wherein the visible expression 1575 of the first person 1 made at the first sequential position during the first viewing of the presentation is presented as a picture-in-picture reaction to one or more events at the first sequential position.

7. The method of any of the above METHOD CLAUSES, wherein the invoking transistor-based circuitry configured to permit the second viewing of the presentation attended by the second person 2 with both the portion of the presentation and the visible expression 1575 of the first person 1 made at the first sequential position during the first viewing of the presentation shown simultaneously at least at the first sequential position comprises:

invoking transistor-based circuitry configured to present a first viewing area at least partly within an outer frame of the presentation within the presentation during the second viewing of (some version of) the presentation attended by the second person 2.

8. The method of any of the above METHOD CLAUSES, further comprising:

invoking transistor-based circuitry configured to obtain a visible expression 1575 of the second person 2 captured at the first sequential position within the presentation during a second viewing of the presentation with both a portion of the presentation and the visible expression 1575 of the first person 1 made at the first sequential position during the first viewing of the presentation shown simultaneously.

9. The method of any of the above METHOD CLAUSES, further comprising:

invoking transistor-based circuitry configured to obtain requests of a plurality of request types, including an asset-metadata-request type, an asset-tags-list request type, and an interacted-with-asset-tag request type.

10. The method of any of the above METHOD CLAUSES, further comprising:

invoking transistor-based circuitry configured to obtain requests of a plurality of request types, including an asset-metadata-request type, an asset-tags-list request type, an interacted-with-asset-tag request type, and a metadata-summary-request type; and invoking transistor-based circuitry configured to obtain a metadata summary summarizing metadata associated with a plurality of videos corresponding to said indicated distributor account, including the indicated video.

11. The method of any of the above METHOD CLAUSES, further comprising:

invoking transistor-based circuitry configured to obtain requests of a plurality of request types, including an asset-metadata-request type, an asset-tags-list request type, and an interacted-with-asset-tag request type; and invoking transistor-based circuitry configured to obtain an asset-tags list comprising a plurality of asset tags associated with an indicated segment of the indicated video and an indicated distributor account, said plurality of asset tags corresponding respectively to a plurality of assets that are depicted during or otherwise associated with said indicated segment of the indicated video.

12. The method of any of the above METHOD CLAUSES, further comprising:

invoking transistor-based circuitry configured to obtain requests of a plurality of request types, including an asset-metadata-request type, an asset-tags-list request type, and an interacted-with-asset-tag request type; and invoking transistor-based circuitry configured to obtain an asset-tags list comprising a plurality of asset tags associated with an indicated segment of the indicated video and an indicated distributor account, said plurality of asset tags corresponding respectively to a plurality of assets that are depicted during or otherwise associated with said indicated segment of the indicated video, wherein each asset tag of said plurality of asset tags comprises time-line spatial data indicate one or more spatial regions within which each asset tag is depicted during said one or more temporal portions of the indicated video, wherein the first sequential position is one of the one or more temporal portions of the indicated video.

13. The method of any of the above METHOD CLAUSES, further comprising:

invoking transistor-based circuitry configured to obtain requests of a plurality of request types, including an asset-metadata-request type, an asset-tags-list request type, and an interacted-with-asset-tag request type; and invoking transistor-based circuitry configured to obtain an asset-tags list comprising a plurality of asset tags associated with an indicated segment of the indicated video and an indicated distributor account, said plurality of asset tags corresponding respectively to a plurality of assets that are depicted during or otherwise associated with said indicated segment of the indicated video, wherein each asset tag of said plurality of asset tags comprises time-line data indicating one or more temporal portions of the indicated video during which each asset tag is depicted or otherwise associated with the indicated video, wherein the first sequential position is one of the one or more temporal portions of the indicated video.

14. The method of any of the above METHOD CLAUSES, further comprising:

invoking transistor-based circuitry configured to obtain requests of a plurality of request types, including an asset-metadata-request type, an asset-tags-list request type, an interacted-with-asset-tag request type, and a person-asset-metadata-request type; and invoking transistor-based circuitry configured to obtain person-asset metadata associated with an indicated person asset and said indicated distributor account, said indicated person asset being depicted during or otherwise associated with the indicated video.

15. The method of any of the above METHOD CLAUSES, further comprising:

invoking transistor-based circuitry configured to obtain requests of a plurality of request types, including an asset-metadata-request type, an asset-tags-list request type, an interacted-with-asset-tag request type, and a person-asset-metadata-request type; and invoking transistor-based circuitry configured to obtain person-asset metadata associated with an indicated person asset and said indicated distributor account, said indicated person asset being a fourth person.

16. The method of any of the above METHOD CLAUSES, further comprising:

invoking transistor-based circuitry configured to obtain requests of a plurality of request types, including an asset-metadata-request type, an asset-tags-list request type, an interacted-with-asset-tag request type, and a person-asset-metadata-request type; and invoking transistor-based circuitry configured to obtain person-asset metadata associated with an indicated person asset and said indicated distributor account, said indicated person asset being the first person 1.

17. The method of any of the above METHOD CLAUSES, further comprising:

invoking transistor-based circuitry configured to obtain requests of a plurality of request types, including an asset-metadata-request type, an asset-tags-list request type, an interacted-with-asset-tag request type, and a person-asset-metadata-request type; and invoking transistor-based circuitry configured to obtain person-asset metadata associated with an indicated person asset and said indicated distributor account, said indicated person asset being the second person 2.

18. The method of any of the above METHOD CLAUSES, further comprising:

invoking transistor-based circuitry configured to obtain requests of a plurality of request types, including an asset-metadata-request type, an asset-tags-list request type, an interacted-with-asset-tag request type, and a place-asset-metadata-request type.

19. The method of any of the above METHOD CLAUSES, further comprising:

invoking transistor-based circuitry configured to obtain requests of a plurality of request types, including an asset-metadata-request type, an asset-tags-list request type, an interacted-with-asset-tag request type, and a place-asset-metadata-request type; and invoking transistor-based circuitry configured to obtain place-asset metadata associated with an indicated place asset and said indicated distributor account, said indicated place asset being depicted during or otherwise associated with the indicated video.

20. The method of any of the above METHOD CLAUSES, further comprising:
invoking transistor-based circuitry configured to obtain requests of a plurality of request types, including an asset-metadata-request type, an asset-tags-list request type, an interacted-with-asset-tag request type, and a place-asset-metadata-request type; and
invoking transistor-based circuitry configured to obtain place-asset metadata associated with an indicated place asset and said indicated distributor account, said indicated place asset being a physical location of the first visible expression 1575 of the first person 1.

21. The method of any of the above METHOD CLAUSES, further comprising:
invoking transistor-based circuitry configured to obtain requests of a plurality of request types, including an asset-metadata-request type, an asset-tags-list request type, an interacted-with-asset-tag request type, and a place-asset-metadata-request type; and
invoking transistor-based circuitry configured to obtain place-asset metadata associated with an indicated place asset and said indicated distributor account, said indicated place asset being a physical location of the second visible expression 1575 of the second person 2.

22. The method of any of the above METHOD CLAUSES, further comprising:
invoking transistor-based circuitry configured to obtain requests of a plurality of request types, including an asset-metadata-request type, an asset-tags-list request type, an interacted-with-asset-tag request type, and a video-playback-user-interface-request type.

23. The method of any of the above METHOD CLAUSES, further comprising:
invoking transistor-based circuitry configured to obtain requests of a plurality of request types, including an asset-metadata-request type, an asset-tags-list request type, an interacted-with-asset-tag request type, and a video-playback-user-interface-request type; and
invoking transistor-based circuitry configured to trigger a user interface configured to control playback of and enable user-interaction with the indicated video, including enabling a remote user to select some or all of said plurality of assets that are depicted during or otherwise associated with said indicated segment of the indicated video, wherein the remote user is the third person 3 and wherein the third viewing of the presentation occurs via the user interface.

24. The method of any of the above METHOD CLAUSES, further comprising:
invoking transistor-based circuitry configured to obtain requests of a plurality of request types, including an asset-metadata-request type, an asset-tags-list request type, an interacted-with-asset-tag request type; and
invoking transistor-based circuitry configured to obtain an asset-tags list comprising a plurality of asset tags associated with an indicated segment of the indicated video and an indicated distributor account, wherein said indicated segment of the indicated video is the first sequential position of the presentation and wherein said plurality of asset tags correspond respectively to a plurality of assets that are depicted during or otherwise associated with said indicated segment of the indicated video.

25. The method of any of the above METHOD CLAUSES, further comprising:
invoking transistor-based circuitry configured to obtain requests of a plurality of request types, including an asset-metadata-request type, an asset-tags-list request type, an interacted-with-asset-tag request type; and
invoking transistor-based circuitry configured to obtain an asset-tags list comprising a plurality of asset tags associated with an indicated segment of the indicated video and an indicated distributor account, wherein said indicated segment of the indicated video is the first sequential position of the presentation and wherein each asset tag of said plurality of asset tags comprises time-line spatial data indicating one or more spatial regions within which each asset tag is depicted during said one or more temporal portions of the indicated video.

26. The method of any of the above METHOD CLAUSES, further comprising:
invoking transistor-based circuitry configured to obtain requests of a plurality of request types, including an asset-metadata-request type, an asset-tags-list request type, an interacted-with-asset-tag request type; and
invoking transistor-based circuitry configured to obtain an asset-tags list comprising a plurality of asset tags associated with an indicated segment of the indicated video and an indicated distributor account, wherein said indicated segment of the indicated video is the first sequential position of the presentation and wherein each asset tag of said plurality of asset tags comprises time-line data indicating one or more temporal portions of the indicated video during which each asset tag is depicted or otherwise associated with the indicated video.

27. The method of any of the above METHOD CLAUSES, further comprising:
invoking transistor-based circuitry configured to implement a time shift of at least 100 milliseconds upon the visible expression 1575 of the first person 1 so that the visible expression 1575 of the first person 1 appears during the second viewing to occur earlier (than an actual detection thereof during the first viewing) relative to the first sequential position.

28. The method of any of the above METHOD CLAUSES, further comprising:
invoking transistor-based circuitry configured to implement a time shift of at most 800 milliseconds upon the visible expression 1575 of the first person 1 so that the visible expression 1575 of the first person 1 appears during the second viewing to occur earlier (than an actual detection thereof during the first viewing) relative to the first sequential position.

29. The method of any of the above METHOD CLAUSES, further comprising:
invoking transistor-based circuitry configured to present the visible expression 1575 of one of the persons captured at a second sequential position within the presentation as an automatic and conditional response to an indication that no visible expression 1575 of another of the persons captured at the second sequential position within the presentation is available.

30. The method of any of the above METHOD CLAUSES, wherein the presentation is an excerpt (of a movie or of an episode of a television series, e.g.).

31. The method of any of the above METHOD CLAUSES, wherein the presentation is a music video.

32. The method of any of the above METHOD CLAUSES, wherein the presentation is a news program.

33. The method of any of the above METHOD CLAUSES, wherein the presentation is a sports presentation.

34. The method of any of the above METHOD CLAUSES, wherein the presentation is an educational (non-fiction) program.

35. The method of any of the above METHOD CLAUSES, wherein the presentation is a fictional account.

36. The method of any of the above METHOD CLAUSES, wherein the presentation is an entire movie.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

What is claimed is:

1. A social-media-enhanced presentation method comprising:
    invoking transistor-based circuitry configured to capture a first visible expression of a first person made at a first sequential position within a presentation during a first viewing of said presentation;
    invoking transistor-based circuitry configured to modify presentation of said first visible expression relative to said first sequential position by time-shifting said first visible expression a fixed amount of time to an earlier presentation time to reduce an appearance of time it took said first person to react to said presentation with said first visible expression;
    invoking transistor-based circuitry configured to capture a second visible expression of a second person made at said first sequential position within said presentation during a second viewing of said presentation with both a portion of said presentation and said first visible expression of said first person made at said first sequential position during said first viewing of said presentation shown simultaneously, wherein said first visible expression is presented to the second person during the second viewing at said earlier presentation time;
    invoking transistor-based circuitry configured to select at least one visible expression to present to a third user during a third viewing of said presentation, wherein said at least one visible expression is selected from a plurality of visible expressions that includes said first visible expression and said second visible expression based on a viewer-provided provenance chain threshold value; and
    invoking transistor-based circuitry configured to present both a portion of said presentation and said selected visible expressions simultaneously during said third viewing of said presentation attended by said third person.

2. The social-media-enhanced presentation method of claim 1, further comprising:
    invoking transistor-based circuitry configured to select said second visible expression of said second person captured at said first sequential position during said second viewing of said presentation with both said portion of said presentation and said first visible expression of said first person made at said first sequential position during said first viewing of said presentation in lieu of said first visible expression of said first person captured at said first sequential position within said presentation during said first viewing of said presentation as a conditional response to an indication that said third person gives a higher priority to content from said second person than to content from said first person; and
    invoking transistor-based circuitry configured to present said first visible expression of said first person captured at a second sequential position within said presentation during said first viewing of said presentation as an automatic and conditional response to an indication that no visible expression of said second person captured at said second sequential position within said presentation is available.

3. The social-media-enhanced presentation method of claim 1, further comprising:
    invoking transistor-based circuitry configured to obtain requests of a plurality of request types, including an asset-metadata-request type, an asset-tags-list request type, an interacted-with-asset-tag request type, and a person-asset-metadata-request type; and
    invoking transistor-based circuitry configured to provide person-asset metadata associated with an indicated person asset and indicated distributor account, said indicated person asset being said second person.

4. A social-media-enhanced presentation method comprising:
    invoking transistor-based circuitry configured to capture a first visible expression of a first person made at a first sequential position within a presentation during a first viewing of said presentation, wherein said presentation includes at least some of an indicated video;
    invoking transistor-based circuitry configured to modify a presentation time of said first visible expression by time-shifting said first visible expression a fixed amount of time relative to said first sequential position to an earlier presentation time to reduce an appearance of time it took said first person to react to said presentation with said first visible expression;
    invoking transistor-based circuitry configured to capture a second visible expression of a second person made at said first sequential position within said presentation during a second viewing of said presentation with both a portion of said presentation and said first visible expression of said first person made at said first sequential position during said first viewing of said presentation shown simultaneously, wherein said first visible expression is presented to the second person during the second viewing at said earlier presentation time;
    invoking transistor-based circuitry configured to select at least one visible expression to present to a third user during a third viewing of said presentation, wherein said at least one visible expression is selected from a plurality of visible expressions that includes said first visible expression and said second visible expression based on a viewer-provided provenance chain threshold value; and
    invoking transistor-based circuitry configured to present, during said third viewing of said presentation to said third person and at said first sequential position, a portion of said presentation with at least one of said second visible expression of said second person made during said second viewing of said presentation and said first visible expression of said first person made during said first viewing of said presentation based on said at least one selected visible expression.

5. The social-media-enhanced presentation method of claim 4, further comprising: invoking transistor-based circuitry configured to obtain requests of a plurality of request types, including an asset-metadata-request type, an asset-tags-list request type, and an interacted-with-asset-tag request type.

6. The social-media-enhanced presentation method of claim 4, further comprising:
invoking transistor-based circuitry configured to obtain requests of a plurality of request types, including an asset-metadata-request type, an asset-tags-list request type, an interacted-with-asset-tag request type, and a metadata-summary-request type; and
invoking transistor-based circuitry configured to obtain a metadata summary summarizing metadata associated with a plurality of videos corresponding to an indicated distributor account, including said indicated video.

7. The social-media-enhanced presentation method of claim 4, further comprising:
invoking transistor-based circuitry configured to obtain requests of a plurality of request types, including an asset-metadata-request type, an asset-tags-list request type, and an interacted-with-asset-tag request type; and
invoking transistor-based circuitry configured to obtain an asset-tags list comprising a plurality of asset tags associated with an indicated segment of said indicated video and an indicated distributor account, said plurality of asset tags corresponding respectively to a plurality of assets that are depicted during or otherwise associated with said indicated segment of said indicated video.

8. The social-media-enhanced presentation method of claim 4, further comprising:
invoking transistor-based circuitry configured to obtain requests of a plurality of request types, including an asset-metadata-request type, an asset-tags-list request type, an interacted-with-asset-tag request type, and a person-asset-metadata-request type; and
invoking transistor-based circuitry configured to obtain person-asset metadata associated with an indicated person asset and an indicated distributor account, said indicated person asset being depicted during or otherwise associated with said indicated video.

9. The social-media-enhanced presentation method of claim 4, further comprising:
invoking transistor-based circuitry configured to obtain requests of a plurality of request types, including an asset-metadata-request type, an asset-tags-list request type, an interacted-with-asset-tag request type, and a person-asset-metadata-request type; and
invoking transistor-based circuitry configured to obtain person-asset metadata associated with an indicated person asset and an indicated distributor account, said indicated person asset being said second person.

10. The social-media-enhanced presentation method of claim 4, further comprising:
invoking transistor-based circuitry configured to obtain requests of a plurality of request types, including an asset-metadata-request type, an asset-tags-list request type, an interacted-with-asset-tag request type, and a place-asset-metadata-request type; and
invoking transistor-based circuitry configured to obtain place-asset metadata associated with an indicated place asset and an indicated distributor account, said indicated place asset being depicted during or otherwise associated with said indicated video.

11. The social-media-enhanced presentation method of claim 4, further comprising:
invoking transistor-based circuitry configured to obtain requests of a plurality of request types, including an asset-metadata-request type, an asset-tags-list request type, an interacted-with-asset-tag request type, and a place-asset-metadata-request type; and
invoking transistor-based circuitry configured to obtain place-asset metadata associated with an indicated place asset and an indicated distributor account, said indicated place asset being a physical location of said first visible expression of said first person.

12. The social-media-enhanced presentation method of claim 4, further comprising:
invoking transistor-based circuitry configured to obtain requests of a plurality of request types, including an asset-metadata-request type, an asset-tags-list request type, an interacted-with-asset-tag request type, and a place-asset-metadata-request type; and
invoking transistor-based circuitry configured to obtain place-asset metadata associated with an indicated place asset and an indicated distributor account, said indicated place asset being a physical location of said second visible expression of said second person.

13. The social-media-enhanced presentation method of claim 4, further comprising:
invoking transistor-based circuitry configured to obtain requests of a plurality of request types, including an asset-metadata-request type, an asset-tags-list request type, an interacted-with-asset-tag request type, and a video-playback-user-interface-request type.

14. The social-media-enhanced presentation method of claim 4, further comprising:
invoking transistor-based circuitry configured to obtain requests of a plurality of request types, including an asset-metadata-request type, an asset-tags-list request type, an interacted-with-asset-tag request type, and a video-playback-user-interface-request type; and
invoking transistor-based circuitry configured to trigger a user interface configured to control playback of and enable user-interaction with said indicated video, including enabling a remote user to select some or all of a plurality of assets that are depicted during or otherwise associated with an indicated segment of said indicated video, wherein said remote user is said third person and wherein said third viewing of said presentation occurs via said user interface.

15. The social-media-enhanced presentation method of claim 4, wherein said invoking transistor-based circuitry configured to present, during said third viewing of said presentation, said portion of said presentation and at least one of said second visible expression of said second person made during said second viewing of said presentation and said first visible expression of said first person made during said first viewing of said presentation comprises:
invoking transistor-based circuitry configured to transmit a connection request from said third person to said second person as an authorization for a social media link with said second person; and
invoking, as an automatic and conditional response to said third person having individually authorized said social media link with said second person, transistor-based circuitry configured to simultaneously present said second visible expression of said second person with said portion of said presentation.

16. A social-media-enhanced presentation system comprising:
transistor-based circuitry configured to capture a first visible expression of a first person made at a first sequential position within a presentation during a first viewing of said presentation;

transistor-based circuitry configured to present said first visible expression to a second person during a second viewing of said presentation, where said first visible expression is time shifted by a fixed amount of time relative to said first sequential position to reduce an appearance of time it took said first person to react to said presentation with said first visible expression;

transistor-based circuitry configured to capture a second visible expression of said second person made at said first sequential position within said presentation during said second viewing of said presentation with both a portion of said presentation and said visible expression of said first person made at said first sequential position during said first viewing of said presentation shown simultaneously;

transistor-based circuitry configured to select at least one visible expression to present to a third user during a third viewing of said presentation, wherein said at least one visible expression is selected from a plurality of visible expressions that includes said first visible expression and said second visible expression based on a viewer-provided provenance chain threshold value; and transistor-based circuitry configured to present both a portion of said presentation and at least one of said second visible expression of said second person made during said second viewing of said presentation and said first visible expression of said first person made during said first viewing of said presentation to said third user during said third viewing based on said at least one selected visible expression.

17. A social-media-enhanced presentation method comprising:

presenting media content to a first person during a first viewing;

capturing a first visible expression of said first person made at a first presentation time within said media content during said first viewing;

presenting said media content to a second person during a second viewing;

presenting simultaneously both said first visible expression of said first person with said media content during said second viewing, wherein presentation of said first visible expression is time-shifted relative to said first presentation time a fixed amount of time to reduce an appearance of time it took said first person to react to said media content with said first visible expression;

capturing a second visible expression of said second person made at said first presentation time within said media content during said second viewing;

selecting, based on a viewer-provided provenance chain threshold value for a third person, at least one visible expression of a plurality of visible expressions that include said first visible expression of said first person and said second visible expression of said second person; and presenting simultaneously both said selected at least one visible expression with said media content to said third person during a third viewing.

18. The social-media-enhanced presentation method of claim 17, wherein presenting simultaneously both said selected at least one visible expression with said media content to said third person during said third viewing further comprises:

presenting simultaneously both said first visible expression of said first person with said media content during said third viewing, wherein presentation of said first visible expression is time-shifted relative to said first presentation time said fixed amount of time; and presenting simultaneously both said second visible expression of said second person with said media content during said third viewing, wherein presentation of said second visible expression is time-shifted relative to said first presentation time said fixed amount of time to reduce an appearance of time it took said second person to react to said media content with said second visible expression.

19. The social-media-enhanced presentation method of claim 17, wherein time-shifting said first presentation time is in a range of approximately 100-800 milliseconds.

* * * * *